(12) United States Patent
Roberts

(10) Patent No.: US 9,447,815 B2
(45) Date of Patent: Sep. 20, 2016

(54) QUICK DETACH ACCESSORY ATTACHMENT

(71) Applicant: Magpul Industries Corp, Boulder, CO (US)

(72) Inventor: Timothy Eric Roberts, Erie, CO (US)

(73) Assignee: MAGPUL INDUSTRIES CORP., Austin, TX (US)

( * ) Notice: Subject to any disclaimer, the term of this patent is extended or adjusted under 35 U.S.C. 154(b) by 161 days.

(21) Appl. No.: 14/530,389

(22) Filed: Oct. 31, 2014

(65) Prior Publication Data

US 2016/0123374 A1    May 5, 2016

(51) Int. Cl.
*F16B 45/00* (2006.01)
*F41C 33/00* (2006.01)
*A45C 13/00* (2006.01)

(52) U.S. Cl.
CPC .............. *F16B 45/00* (2013.01); *A45C 13/001* (2013.01); *F41C 33/006* (2013.01)

(58) Field of Classification Search
CPC ...... F16B 21/165; F16B 21/16; F16B 45/00; Y10T 403/592; Y10T 24/4501; F41C 33/006; F41C 13/001; F41C 23/02
See application file for complete search history.

(56) References Cited

U.S. PATENT DOCUMENTS

| | | |
|---|---|---|
| 317,448 A | 5/1885 | Evans |
| 679,580 A | 7/1901 | Vilpou |
| 1,316,640 A | 9/1919 | Parsons |
| 1,964,427 A | 6/1934 | Chandler |
| 1,993,749 A | 3/1935 | Pleister |
| 2,078,010 A | 4/1937 | Meepos |
| 2,116,618 A | 5/1938 | Crockett |
| 2,399,581 A | 4/1946 | Spooner et al. |
| 2,480,662 A * | 8/1949 | McKinzie ............... F41C 23/02 24/607 |
| 2,515,807 A | 7/1950 | Spooner et al. |
| 2,642,689 A * | 6/1953 | Cline ..................... F41C 23/02 24/607 |
| 2,679,707 A | 6/1954 | Merlino |
| 2,771,699 A | 11/1956 | Herter |
| 2,901,804 A | 9/1959 | Williams |
| 2,960,741 A | 11/1960 | Bruno |
| 3,043,563 A | 7/1962 | De Pew et al. |

(Continued)

FOREIGN PATENT DOCUMENTS

| | | |
|---|---|---|
| DE | 102013018953 A1 | 6/2014 |
| DE | 102013018953 A8 | 8/2014 |
| RU | 2531429 C2 | 10/2014 |

OTHER PUBLICATIONS

Google Search, "BlackHawk 71SS00BK BH Hard Push Button Sling Swivel", Webpage found at https://www.google.com/webhp?tab=tw&ei=5El_VLzjJ4XSoAShp4HoAg&ved=0CAQQqS4oAQ#q=blackhawk+71ss00bk+bh+hard+push+button+sling+swivel&tbm=shop downloaded on Dec. 3, 2014, p. 1, Published in: US.

(Continued)

*Primary Examiner* — Adam Waggenspack
(74) *Attorney, Agent, or Firm* — Neugeboren O'Dowd PC

(57) ABSTRACT

This disclosure provides an accessory attachment, comprising a housing with a top end and a bottom end, at least one locking member, a spring-biased retractor apparatus operable to move the locking member from an engaged position to a disengaged position, and finger grips attached to the retractor apparatus. The accessory attachment may be attached to, or removed from, a mounting receptacle either by pushing or pulling the finger grips toward or away from either end of the housing parallel to a longitudinal axis of the housing.

26 Claims, 17 Drawing Sheets

(56) References Cited

U.S. PATENT DOCUMENTS

| | | |
|---|---|---|
| 3,046,827 A | 7/1962 | Myers |
| 3,052,940 A | 9/1962 | Sellers |
| 3,061,965 A | 11/1962 | Lewis |
| 3,066,375 A | 12/1962 | Belding et al. |
| 3,068,737 A | 12/1962 | Mewse |
| 3,085,462 A * | 4/1963 | Myers ............... F16B 21/165 24/453 |
| 3,226,872 A | 1/1966 | Pachmayr |
| 3,233,496 A | 2/1966 | De Pew et al. |
| 3,430,305 A | 3/1969 | Geffner |
| 3,478,641 A | 11/1969 | Dohmeier |
| 3,667,566 A | 6/1972 | Hopkins |
| 3,793,685 A | 2/1974 | Knecht |
| 3,844,194 A | 10/1974 | Reinwall |
| 3,980,327 A | 9/1976 | Duran |
| 4,111,477 A | 9/1978 | Rigali |
| 4,365,535 A | 12/1982 | Buttner et al. |
| 4,453,449 A | 6/1984 | Hollmann |
| 4,571,872 A | 2/1986 | Johnson |
| 4,605,350 A | 8/1986 | Chater et al. |
| 4,709,454 A | 12/1987 | Barnes |
| 4,859,118 A | 8/1989 | Schaeffer |
| 4,908,916 A | 3/1990 | Berte |
| 4,988,248 A | 1/1991 | Flux |
| 5,207,544 A | 5/1993 | Yamamoto et al. |
| 5,299,379 A | 4/1994 | Hawk |
| 5,352,066 A | 10/1994 | Schaeffer et al. |
| 5,354,076 A | 10/1994 | Yeo et al. |
| 5,518,335 A | 5/1996 | Dobbins |
| 5,584,501 A | 12/1996 | Walters |
| 5,590,900 A | 1/1997 | Duran et al. |
| 5,615,462 A | 4/1997 | Goto |
| 5,685,102 A | 11/1997 | Latka |
| 5,692,654 A | 12/1997 | Bell |
| 5,775,725 A | 7/1998 | Hodac et al. |
| 5,845,377 A | 12/1998 | Bibeault |
| 5,988,364 A | 11/1999 | Boyce et al. |
| 6,077,011 A | 6/2000 | Walker |
| 6,299,106 B1 | 10/2001 | Shorey |
| 6,386,789 B1 | 5/2002 | Chausse et al. |
| 6,511,100 B1 | 1/2003 | Clinche |
| 6,551,041 B2 | 4/2003 | Choate |
| 6,618,892 B2 | 9/2003 | Schmitt |
| 6,840,703 B2 | 1/2005 | Blanchard |
| 6,887,022 B2 | 5/2005 | Choate |
| 7,052,223 B1 | 5/2006 | Miller |
| D556,850 S | 12/2007 | Kincel |
| 7,562,481 B2 | 7/2009 | Esch |
| 7,654,027 B1 | 2/2010 | Grover |
| 7,731,465 B2 | 6/2010 | Stapulionis et al. |
| 7,748,091 B2 | 7/2010 | Bogh-Sorensen |
| 7,752,797 B1 | 7/2010 | Swan |
| 7,814,697 B2 | 10/2010 | Esch |
| 7,891,903 B2 | 2/2011 | Klingenberg et al. |
| 7,914,225 B2 | 3/2011 | Hagerman |
| D639,890 S | 6/2011 | Troy |
| 8,056,862 B1 | 11/2011 | Tomerlin et al. |
| 8,162,581 B2 | 4/2012 | Soltis et al. |
| 8,282,318 B2 | 10/2012 | Robertson, Jr. |
| 8,336,931 B2 | 12/2012 | Cotton et al. |
| 8,429,843 B2 | 4/2013 | Yan |
| 8,480,329 B2 | 7/2013 | Fluhr et al. |
| 8,500,358 B1 | 8/2013 | Cassidy |
| 8,516,732 B2 | 8/2013 | Burnsed |
| 8,544,153 B2 | 10/2013 | Mayberry et al. |
| 8,596,701 B2 | 12/2013 | Alba |
| 8,821,061 B2 | 9/2014 | Baus |
| 8,832,986 B2 | 9/2014 | Mayberry et al. |
| 2001/0009632 A1 | 7/2001 | Cross |
| 2010/0150648 A1 | 6/2010 | Judge et al. |
| 2011/0162176 A1 | 7/2011 | Tylaska et al. |
| 2012/0288325 A1 | 11/2012 | Blanchard |
| 2013/0279968 A1 | 10/2013 | Li et al. |
| 2013/0279973 A1 | 10/2013 | Li |
| 2013/0305582 A1 * | 11/2013 | Mayberry ............. F41C 33/006 42/85 |
| 2014/0116057 A1 | 5/2014 | Peters |
| 2015/0110575 A1 | 4/2015 | Langlais et al. |
| 2015/0233522 A1 | 8/2015 | Kallas et al. |

OTHER PUBLICATIONS

Police HQ, "Command Arms Heavy Duty Push Button Sling Swivel", Webpage found at http://www.policehq.com/Products/EMA-PBSS downloaded on Dec. 3, 2014,p. 1 Published in: US.

Carr Lane Manufacturing Co., "Ball Lock Pins", Jan. 1, 2014, p. 1, Webpage found at http://www.carrlane.com/catalog/index.cfm/26825071F0B221118070C1 downloaded on Nov. 24, 2014.

GROVTEC US, Inc., "Manganese Phosphate Heavy Duty Push Button Swivels", p. 4, Jan. 1, 2014, Webpage found at http://www.grovtec.com/catalog/gt-swivels/manganese-phosphate-heavy known to exist prior to at least Jul. 1, 2014.

D. Kostelnicek, "Quick-Connect Pneumatic Couplers", Aug. 1, 2003, p. 3, vol. 8, No. 8, Publisher: Home Metal Shop Club, Published in: United States of America.

Semick, Joshua T., "Office Action re Application No. 14581544", Aug. 3, 2015, p. 34 Published in: US.

Schneider, Laura A., "Response to Office Action re Application No. 14581544", Aug. 28, 2015, p. 18, Published in: US.

M4CARBINE, "Magpul ASAP Sling Plate", "Webpage found at http://www.m4carbine.net/showthread.php?26217-Magpul-ASAP-Sling-Plate, Known to exist as early as Dec. 5, 2013",p. 4.

"Bicycle Steerer", "Webpage found at https://ccxxuq.blu.livefilestore.com/y1pU5TPO_hTuRNPBn2VTbKOHGeOC-tH59hVdN2Fzly_jTf5qst2khE_tIQWJgKEH-98WQhFmIZLb_24/DSC02701.jpg", Known to exist as early as Dec. 5, 2013, p. 1, Published in: US.

bicycledesigner.com, "Stem for Threaded Headset", "Webpage found at http://www.bicycledesigner.com/bike-parts/bicycle-stem/stem-for-threaded-headset-1.html", Known to exist as early as Dec. 5, 2013 , p. 4 Published in: US.

Youtube, "Loose AR15 Upper and Lower Fix—Demon Tactical Quick Pin", "Webpage found at http://www.youtube.com/watch?v=I75YCnj3FTE", Known to exist as early as Dec. 5, 2013 , p. 3, Published in: US.

Demon Tactical, "Demon Tactical Quick Pin", "Webpage found at http://www.demontactical.com/demon-tactical-quick-p-57648.html", Known to exist as early as Dec. 5, 2013, p. 1, Published in: US.

GG&G, "AR-15/M16 Receiver End Plate Sling Mount With Enhanced Heavy Duty Quick Detach Sling Swivel", "Webpage found at http://www.gggaz.com/ar-15-m16-receiver-end-plate-qd-sling-mount-with-enhanced-qd-sling-swivels.html Inventor(s) aware of prior art o", Known to exist as early as Dec. 5, 2013 , p. 2, Published in: US.

Bitter End Choppers, "Internal Throttle", "Webpage found at http://www.bitterendchoppers.com/Misc.html", Known to exist as early as Dec. 5, 2013, p. 3, Published in: US.

JP Enterprises, "JP Tension Pin", "Webpage found at http://www.jprifles.com/1.5.1.7_small_tp.php", Known to exist as early as Dec. 5, 2013, p. 2 Published in: US.

ar15.com, "Magpul M93 QD Plate", "Webpage downloaded at http://www.ar15.com/archive/topic.html?b=38,f=128,t=242264", Known to exist as early as Dec. 5, 2013, p. 19 Published in: US.

ar15.com, "Magpul's PRS G3", "Webpage found at http://www.ar15.com/archive/topic.html?b=6&f=9&t=213719", Known to exist as early as Dec. 5, 2013 , p. 1 Published in: US.

Midway USA, "How to Combine AR-15 Upper and Lower Receivers Presented by Larry Pottertield of Midway USA", "Webpage found at http://www.youtube.com/watch?v=dXbZeuBacnw", Known to exist as early as Dec. 5, 2013, p. 3, Published in: US.

Noveske, "Noveske QD End Plate", Known to exist as early as Dec. 5, 2013, p. 2, Published in: US.

Bing, "QD Swivels Search", "Webpage found at http://www.bing.com/images/search?q=QD+swivels&qpvt=QD+swivels&FORM=IQFRML", Known to exist as early as Dec. 5, 2013 , p. 2.

(56) References Cited

OTHER PUBLICATIONS

Peter White Cycles, "Nitto Racing Stem", "Webpage found at http://www.peterwhitecycles.com/images/products/stems/nittoracingstem1.jpg", Known to exist as early as Dec. 5, 2013, p. 1.

Rammounts, "Ram Wedge Search", "Webpage found at http://www.rammount.com/search?utf8=%E2%9C93&query=ram+wedge+mount&search_button=GO", Known to exist as early as Dec. 5, 2013, p. 2.

Magpul Industries, Corp., "Forward Sling Mount", "Webpage found at https://www.magpul.com/products/forward-sling-mount-1", Known to exist as early as Mar. 26, 2015, p. 4 Published in: US.

Wikipedia, "Quill Stem (Bicycle Part)", "Webpage found at http://en.wikipedia.org/wiki/Stem_(bicycle_part)", Known to exist as early as Mar. 26, 2015, p. 8, Published in: US.

Cheaper Than Dirt, "Troy Industries AR-15 OEM M4 Battlesling Endplate Mount with QD Swivel Aluminum Flat Dark Earth SMOU-M4S-00FT-00", "Webpage found at http://www.cheaperthandirt.com/product/9-71898", Known to exist as early as Dec. 5, 2013, Published in: US.

American Van Equipment, "Hitch Vise Mount", "Webpage found at http://www.americanvan.com/hitch-vise-mount.html", Known to exist as early as Dec. 5, 2013, p. 2, Published in: US.

\* cited by examiner

QUICK DETACH ACCESSORY ATTACHMENT

FIELD OF THE DISCLOSURE

The present invention relates to the field of accessory attachments and more particularly relates to a quick detach accessory attachment for slings and other devices.

BACKGROUND

Various attachment pieces, adaptors, and mechanical apparatuses exist for the purpose of coupling slings and other accessories to personal articles. One common type of accessory attachment is the kind used for coupling a flexible sling or a strap to a solid article for carrying. For example, some kind of coupling mechanism comprising an accessory attachment and a corresponding mount is usually required for coupling a sling or strap to a piece of luggage, a bag or briefcase, a tool, an instrument, or a weapon. Among these coupling mechanisms are various kinds of hooks, clips, buckles, locks, and detents. Similar coupling mechanisms are used for securing a tether, such as a rope or a cord, to an article to keep it nearby, or to support a weight. For example, coupling mechanisms include clasps for dog leashes or carabiners for supporting a climber's weight. Some coupling mechanisms have high load-bearing requirements (e.g., those used for securing a boat to a dock) and others have minimal requirements (e.g., those used for keychains).

Many of these coupling mechanisms are implemented specifically because they are detachable. For example, many bags have detachable shoulder straps because sometimes it is more desirable to hold the bag in a manner other than on a shoulder, and the long strap can get in the way if it is not detachable. For some applications, there exists a need to securely hold an accessory to an article while still being capable of quickly detaching. In the field of firearms accessories, for example, several types of "quick-detach," or "QD" accessory attachments and corresponding mounts have been developed in order to facilitate the coupling and detachment of slings to various mounting points.

As noted, a common mechanism that allows the accessory attachments to couple to the QD mounts is a detent. Detents are well known in the art, and there are a number of ways in which a detent may be retracted, or disengaged from its protruded, or engaged, position. One common way for a detent to be retracted or disengaged is to press a button that is situated on top of the accessory attachment. This button must usually be pressed downward toward the article to which the accessory attachment is coupled. This downward pressing motion is suitable for coupling the accessory attachment to the article, but is awkward when trying to remove it. The user must press the button in the opposite direction that the user is pulling in order to remove the sling attachment. A user can do this by gripping the sides of the attachment with two fingers and pressing down on the button with a third finger (or thumb) in between the two. This type of manipulation may become difficult when a user is wearing gloves, or is trying to perform this task quickly. Alternatively, a user could press the button with one finger and pull the article away with the other hand. This method may be unsatisfactory if the user only has one hand available. One approach that has been used that doesn't require the user to push a button in the opposite direction of the pull is described in U.S. Patent Publication 2013/0305582, incorporated herein by reference in its entirety, in which the user can press buttons inward, in an orthogonal direction relative to the push or pull of coupling or detaching an accessory attachment. However, it is also desirable to allow the user to operate the mechanism in other ways. Improvements are necessary to make accessory attachment or detachment easy to perform even with gloves or with one hand. The present disclosure is directed toward remedying such deficiencies in the prior art.

SUMMARY OF THE DISCLOSURE

In view of the foregoing disadvantages inherent in the known types of accessory attachment, this disclosure provides an improved accessory attachment. As such, the present disclosure's general purpose is to provide a new and improved accessory attachment that may be attached to, or removed from, a mounting receptacle by either a pushing or pulling motion. That is, a pushing motion can be used during insertion and a pulling motion during removal.

To accomplish these objectives, this disclosure provides an accessory attachment which comprises a housing with a top end and a bottom end, at least one locking member, a spring-biased retractor apparatus operable to move the at least one locking member from an engaged position to a disengaged position, and finger grips attached to the retractor apparatus. The accessory attachment may be attached to, or removed from, a mounting receptacle either by pushing or pulling the finger grips toward or away from either end of the housing parallel to a longitudinal axis of the housing.

Another purpose of this disclosure is to provide a system for attaching an accessory to a firearm. The system comprises a firearm accessory, a firearm configured with a quick-detach mounting receptacle, and an accessory attachment. The accessory attachment comprises a housing with a top end and a bottom end, at least one locking member, a spring-biased retractor apparatus to move the at least one locking member from an engaged position to a disengaged position, and finger grips. The accessory attachment may be attached to, or removed from, the quick-detach mounting receptacle either by pushing or pulling the finger grips toward or away from either end of the housing parallel to a longitudinal axis of the housing.

Another purpose of this disclosure is to provide a sling attachment system. The system comprises a sling, an article configured with a mounting receptacle, and an accessory attachment. The accessory attachment comprises a housing with a top end and a bottom end, at least one locking member, a spring-biased retractor apparatus to move the at least one locking member from an engaged position to a disengaged position, and finger grips. The accessory attachment may be attached to, or removed from, the quick-detach mounting receptacle either by pushing or pulling the finger grips toward or away from either end of the housing parallel to a longitudinal axis of the housing.

Yet another purpose of this disclosure is to provide a tether attachment system. The system comprises a tether, an article, configured with a mounting receptacle, to be coupled to an end of the tether, and an accessory attachment. The accessory attachment comprises a housing with a top end and a bottom end, at least one locking member, a spring-biased retractor apparatus to move the at least one locking member from an engaged position to a disengaged position, and finger grips. The accessory attachment may be attached to, or removed from, the quick-detach mounting receptacle either by pushing or pulling the finger grips toward or away from either end of the housing parallel to a longitudinal axis of the housing.

Several features of the disclosure have thus been outlined in order that the more detailed description that follows may be better understood and in order that the present contribution to the art may better be appreciated. Additional features of the disclosure will be described hereinafter and will form the subject matter of the claims that follow.

Many objects of this disclosure will appear from the following description and appended claims, reference being made to the accompanying drawings forming a part of this specification wherein like reference characters designate corresponding parts in the several views.

Before explaining at least one embodiment of the disclosure in detail, it is to be understood that the disclosure is not limited in its application to the details of construction and the arrangements of the components set forth in the following description or illustrated in the drawings. The disclosure is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

With reference now to the drawings, various embodiments of an accessory attachment are herein described. It should be noted that the articles "a", "an" and "the", as used in this specification, include plural referents unless the content clearly dictates otherwise.

Figure 1:
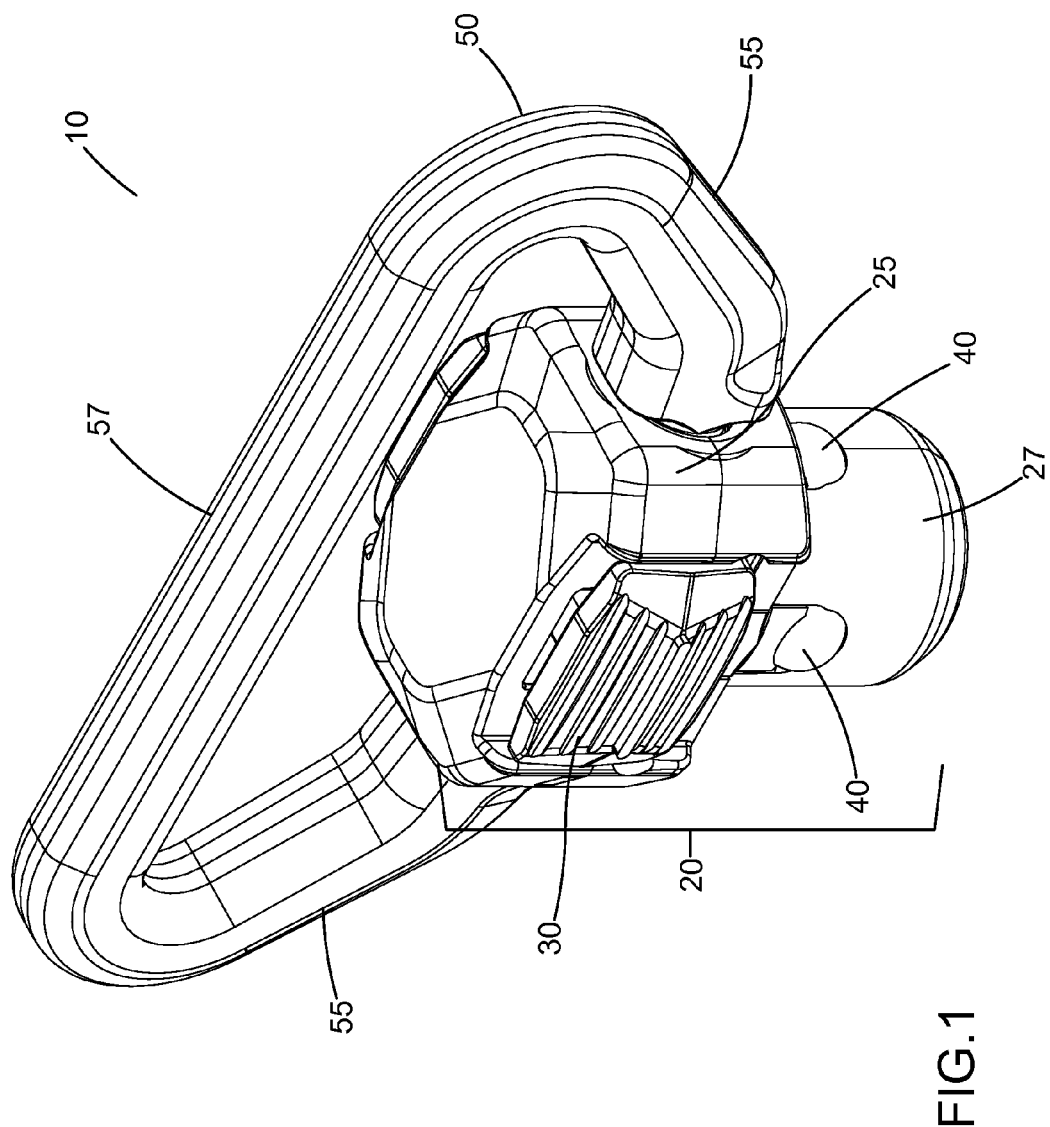
FIG. 1 is a front perspective view of an accessory attachment according to an embodiment of the present disclosure.
Figure 2:
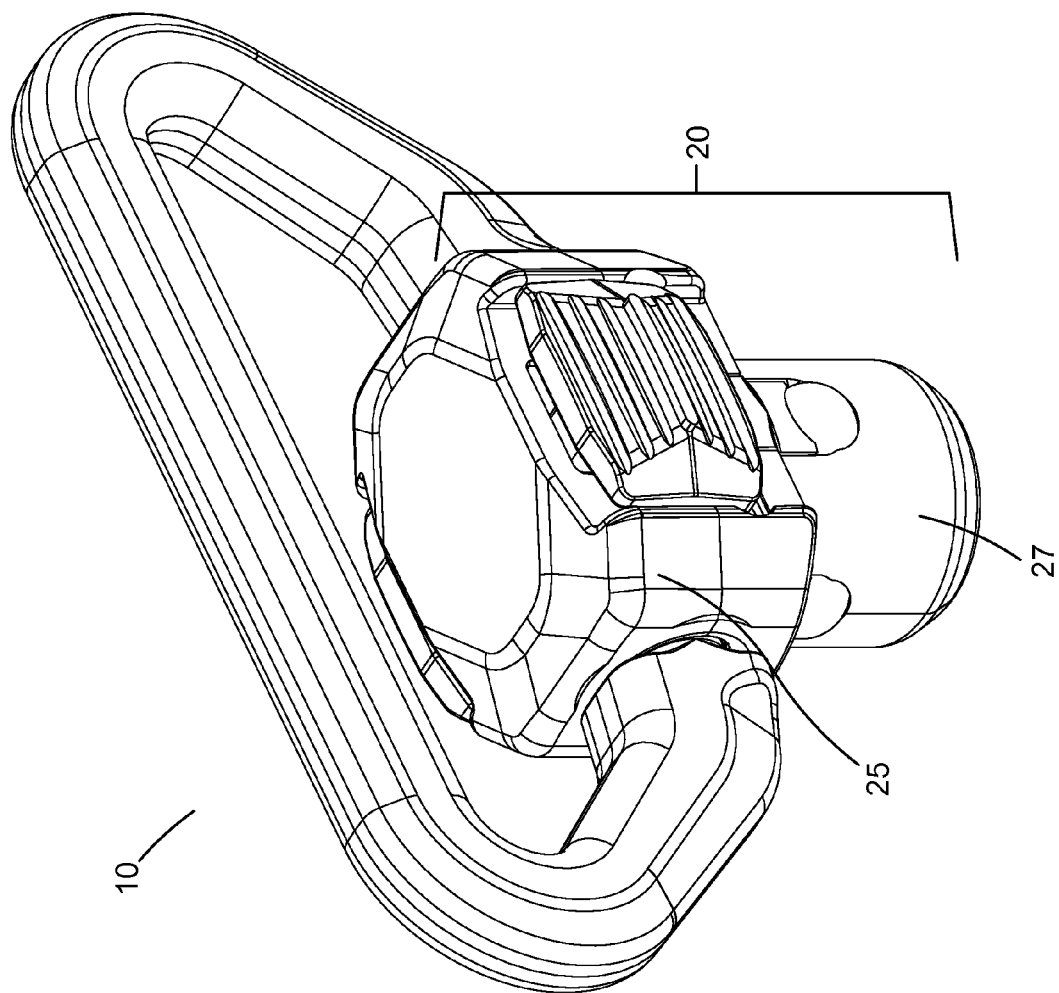
FIG. 2 is an opposing perspective view of the accessory attachment of FIG. 1

With reference to FIGS. 1 and 2, the accessory attachment 10 in the embodiment depicted generally comprises a housing 20, finger grips 30, locking members 40, and a bail 50. For the purposes of this disclosure, the term "detent" may be used to describe parts of the accessory attachment 10 that function to hold the accessory attachment 10 in a particular place, because a detent is known in the art to be a simple mechanism that utilizes locking components to hold other components in place relative to each other. In the embodiment depicted, the housing 20 comprises an upper housing 25 and a lower housing 27 that are separate components. However, it is contemplated that the entire housing 20 could be constructed as a one-piece housing, such as by an overmolding process around the inner components. In yet another embodiment, the housing 20 can be constructed out of multiple pieces other than an upper housing and a lower housing; for example, the housing 20 could comprise a left and right housing, or more than two separable pieces. Additionally, the bail 50 in this embodiment is depicted as a loop attached to the housing 20, the loop being comprised of linking members 55 extending outwardly from the sides of the housing 20 and a rigid bar member 57 connecting the linking members 55 and situated above and substantially parallel to a top of the housing 20. For purposes of clarity, the end of the housing attached to the bail 50 shall be referred to as the "top" of the housing 20 herein, and the opposite end of the housing shall be referred to as the "bottom" of the housing 20. The bail 50 as depicted herein allows for the easy attachment of a sling, such as those used for carrying articles on shoulders. However, it is contemplated that the bail 50 may be comprised in alternative forms without departing from the disclosure. The bail 50 in this embodiment is pivotably attached by the linking members 55 to the housing 20. That is, the bail 50 may pivot at the points of connection of the linking members 55 to the housing 20, such that the rigid bar member 57 can be oriented to the side of the housing 20 and even below a plane intersecting and parallel to the top of the housing 20. The bail 50 may be large enough such that the rigid bar member could rotate completely around the bottom of the housing 20. It is contemplated, though, that a bail may be formed in substantially the same shape, but may be fixedly attached to the housing 20. Additionally, the housing 20 may be configured at the top to retain attachment mechanisms other than a loop or a bail, such as clips, hooks, buckles, buttons, or specifically formed equipment mounts.

Figure 3:
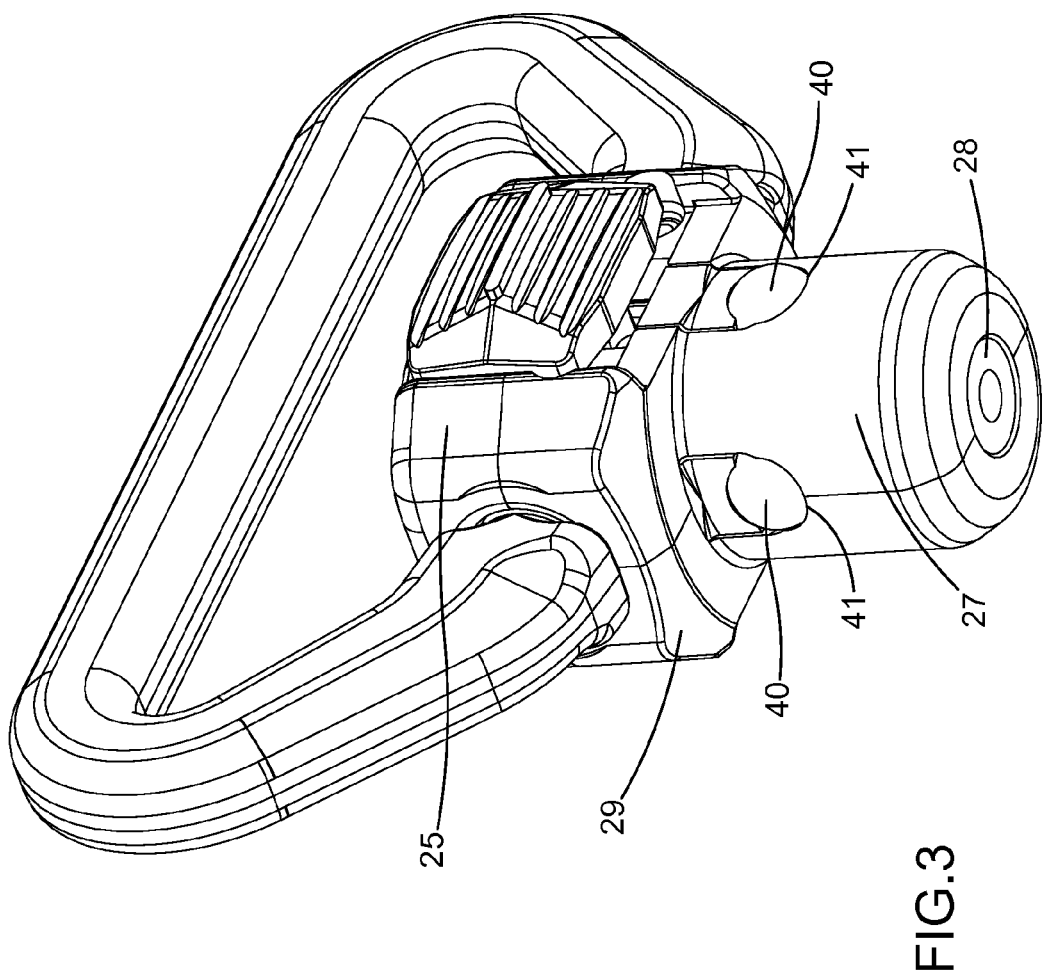
FIG. 3 is a bottom perspective view of the accessory attachment of FIG. 1

FIG. 3, which is a bottom perspective view of the accessory attachment 10, shows the lower housing 27 having a substantially cylindrical shape and substantially flat bottom surface. The lower housing comprises windows 41 through which locking members 40 may protrude or retract. Part of the lower housing 27 forms a ledge 29 just above the locking members 40. The ledge 29 protrudes beyond the circumference of the cylindrical portion of lower housing 27.

Figure 4:
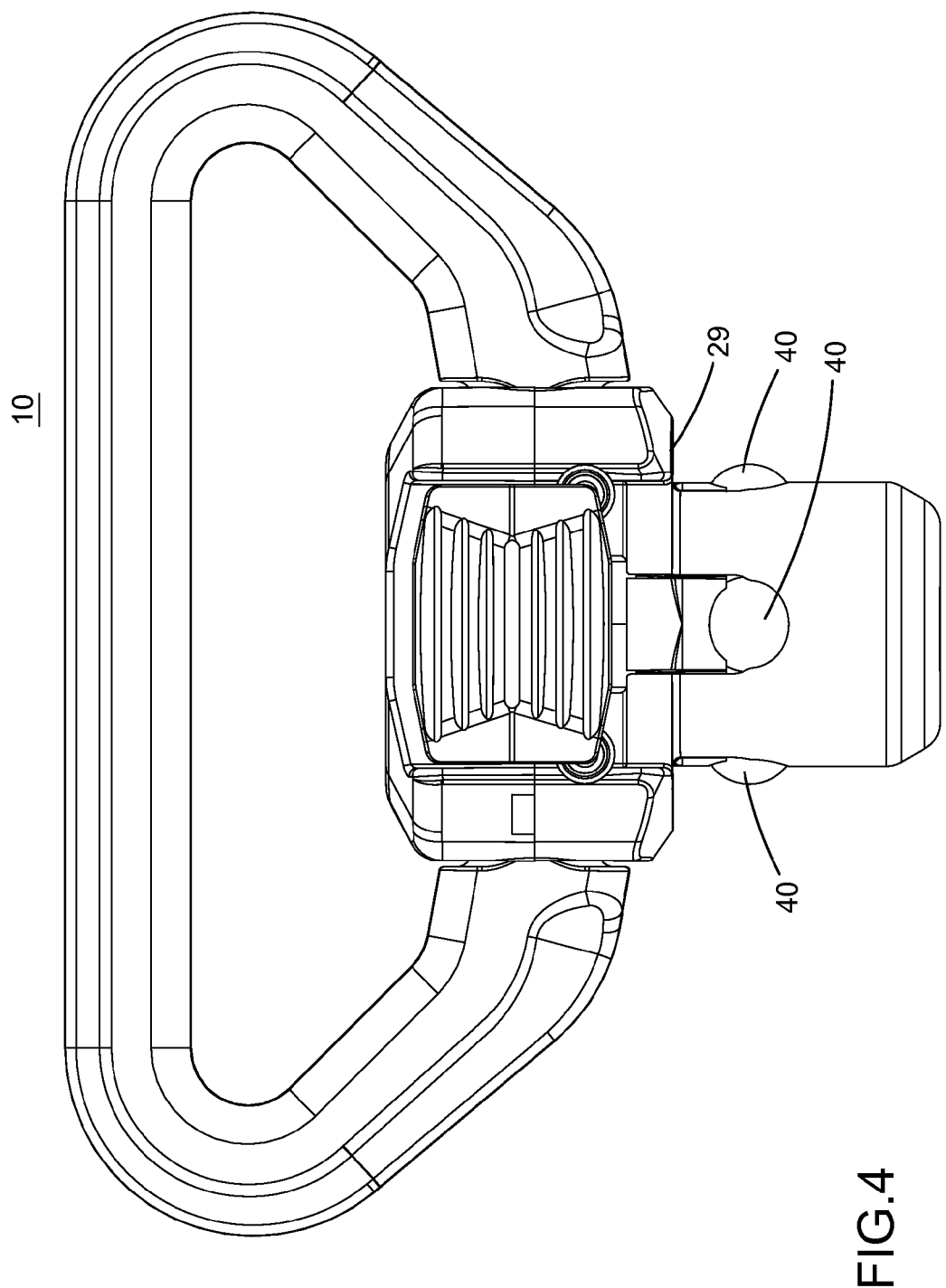
FIG. 4 is a front plan view of the accessory attachment of FIG. 1
Figure 5:
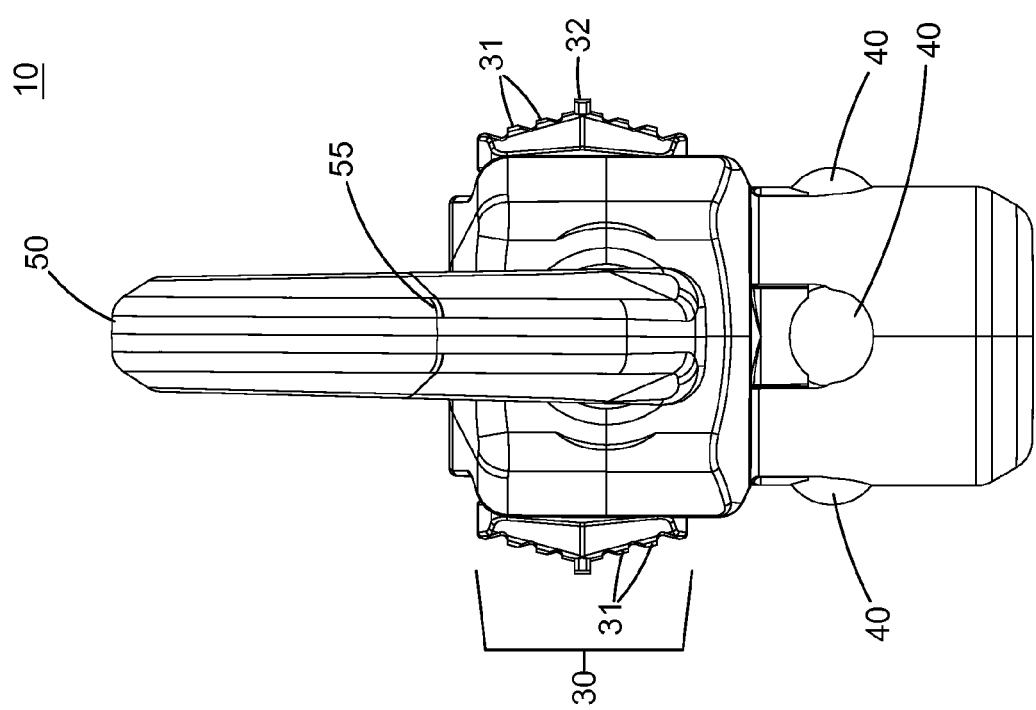
FIG. 5 is a side plan view of the accessory attachment of FIG. 1
Figure 7:
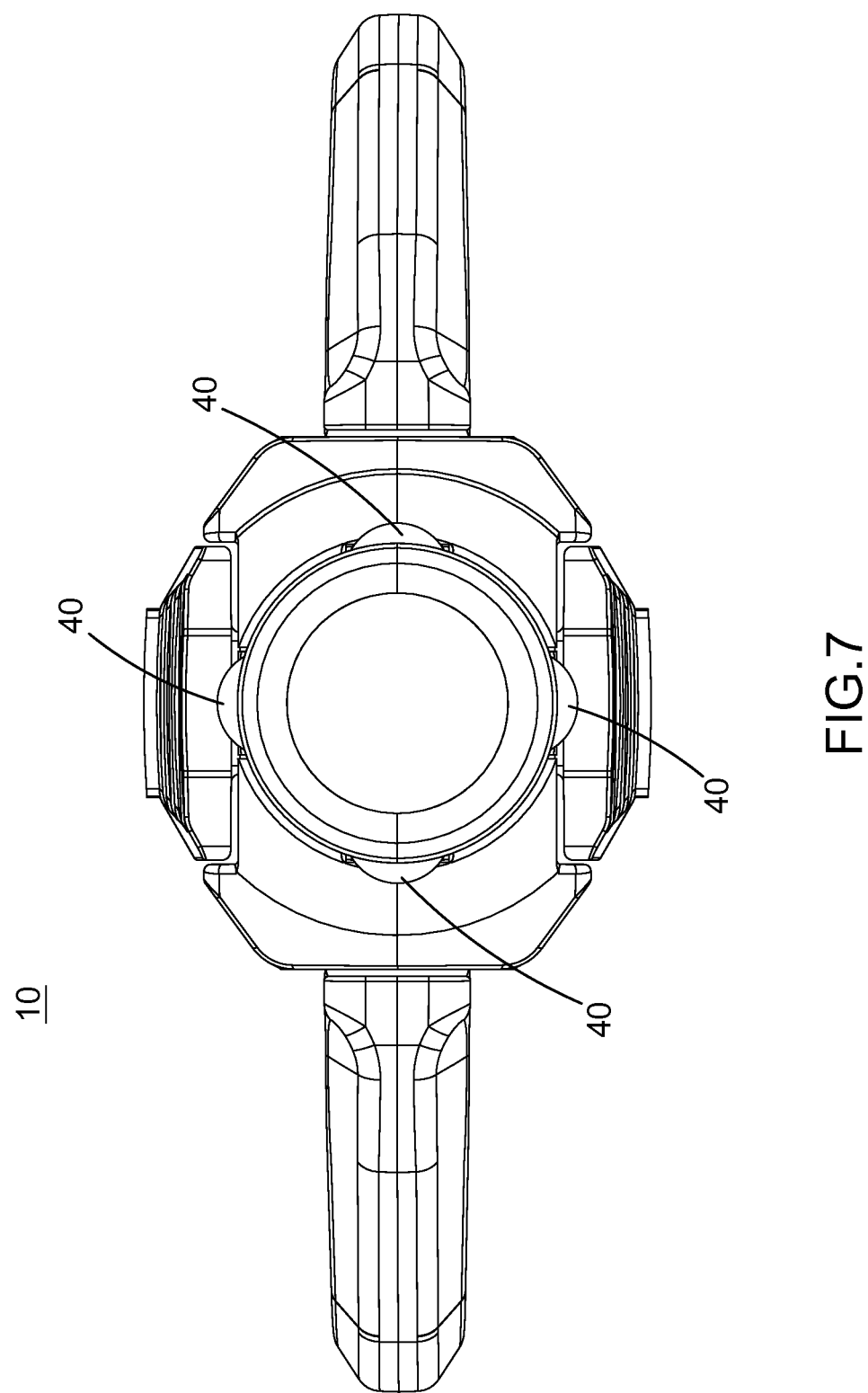
FIG. 7 is a bottom plan view of the accessory attachment of FIG. 1

Referring now to FIGS. 4, 5, and 7, the embodiment shown has four locking members 40. In the embodiment shown, the shape of the lower housing 27, the windows 41, and locking members 40 are configured so that the accessory attachment 10 can couple to a mounting receptacle configured to receive the lower housing 27 and the locking members 40. Other variations of the accessory attachment 10 can include differing sizes, shapes, and numbers of locking members 40 without departing from the scope of this disclosure. For example, it is contemplated that the mechanisms for retracting and engaging detents described herein may be applied to embodiments where the locking members 40 have either larger or smaller diameters than those shown. It is also contemplated that locking members may have different geometrical shapes, such as oval, triangular, square, while still being able to couple to specially configured or previously existing mounting receptacles. Additionally, other embodiments of the disclosure may vary greatly in size, in order to be suitable for a variety of mechanical locking applications.

In some embodiments of this disclosure, many components of the accessory attachment 10 can be made of metals and metal alloys, while others can be made out of substantially rigid and resilient polymer materials. It may be desirable for outer components to be made out of metal and metal alloys because of their strength properties as compared to known polymer materials. Other embodiments can be formed from a combination of polymers and other materials, metals and other materials, polymers and metals, or polymers, metals, and other materials. Metal components may be manufactured using techniques such as machining, casting, and metal injection molding. Polymer components may be manufactured using various molding techniques as well. There can be advantages to manufacturing certain internal components, such as the crown (which will be described presently), out of polymer materials. These advantages include ease of production and low cost, compare to metal, while still providing sufficient strength for its purposes.

Figure 6:
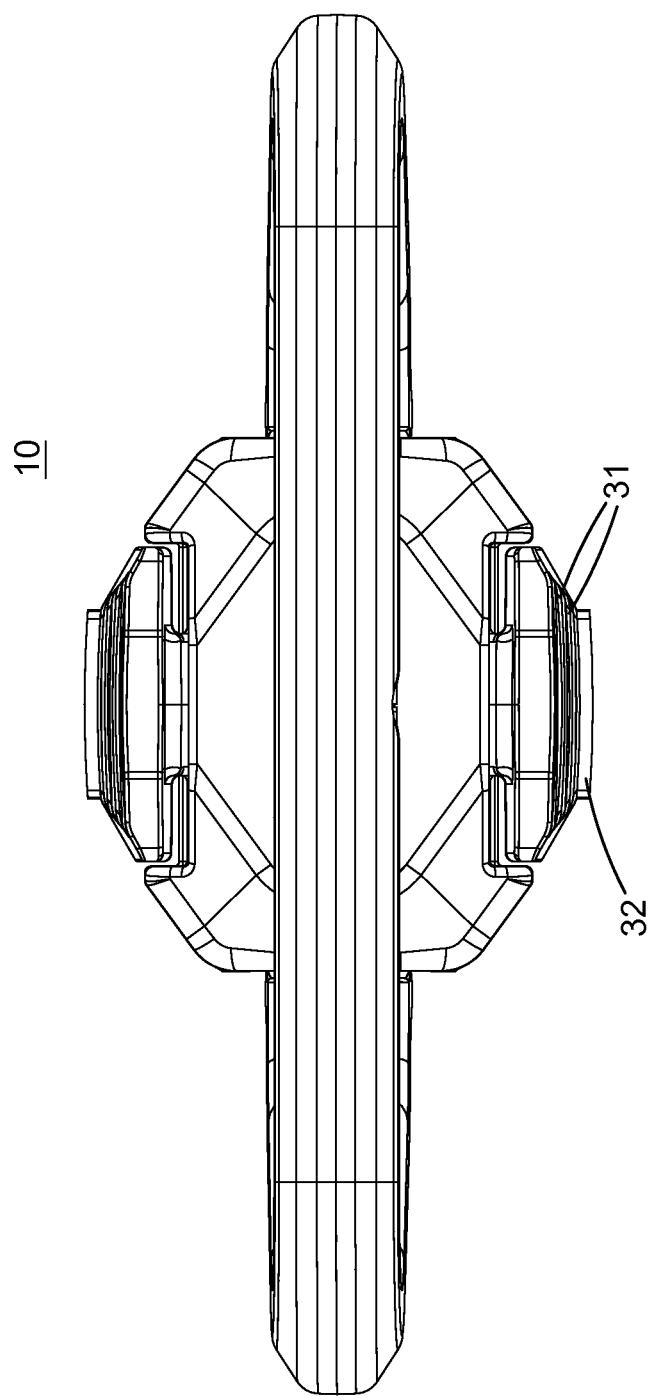
FIG. 6 is a top plan view of the accessory attachment of FIG. 1

Referring now to FIGS. 5 and 6, finger grips 30 are shown spaced on opposing sides of the housing 20, on sides of the housing 20 which are not attached to the linking members 55 of the bail 50. The finger grips 30 as depicted are structures having a surface configured in size and texture for the main purpose of being easily manipulated by bare or gloved fingers. Further, finger grips 30 are coupled to a retractor apparatus 75, which will be described presently, for the purpose of moving the retractor apparatus 75 up and down. The finger grips 30 in the embodiment shown are distinctly separate from the bail 50. A benefit to having the finger grips 30 located opposite each other is that a user can grip them with an index finger and thumb without any interference from the bail 50. Finger grips 30 as depicted each have a plurality of ridges 31 which provide a gripping surface, and can be shaped to slope away and inward from a midpoint 32, such that the finger grip 30 is wider in the middle than toward the top or the bottom. Such a shape of the finger grips 30 allows an easy grip, even with gloves. An aspect of the disclosure is that finger grips 30 may be pushed down toward the bottom of the housing or pulled up toward a top of the housing. The push or pull in either direction will retract the locking members 40 such that the attachment accessory 10 may be inserted into or removed from a mount. The mechanism of this aspect will be described presently. An advantage to the finger grips 30 having a sloping shape away and inward from the midpoint 32 allows a user to easily apply force in an upward or downward motion.

Figure 8:
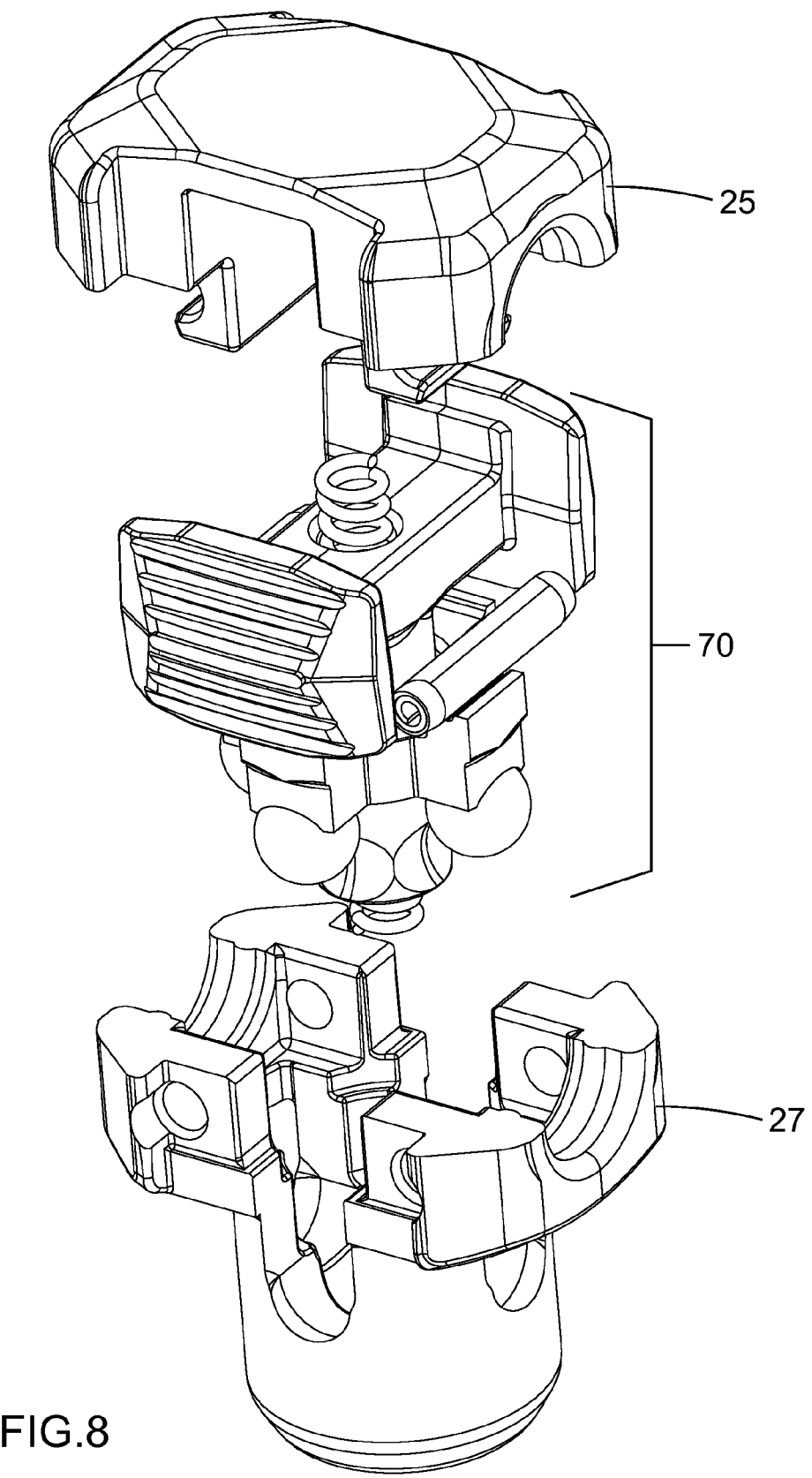
FIG. 8 is a partially exploded view of the external and internal components of an embodiment of this disclosure.

Turning now to FIG. 8, shown is a partially exploded view of the upper housing 25, lower housing 27, and an assembly of an internal detent operational mechanism 70. The internal detent operational mechanism 70 is not a unified structure with parts necessarily attached to each other, but rather is shown in FIG. 8 in a manner depicting how individual parts cooperate with each other when situated within the upper housing 25 and lower housing 27.

Figure 9:
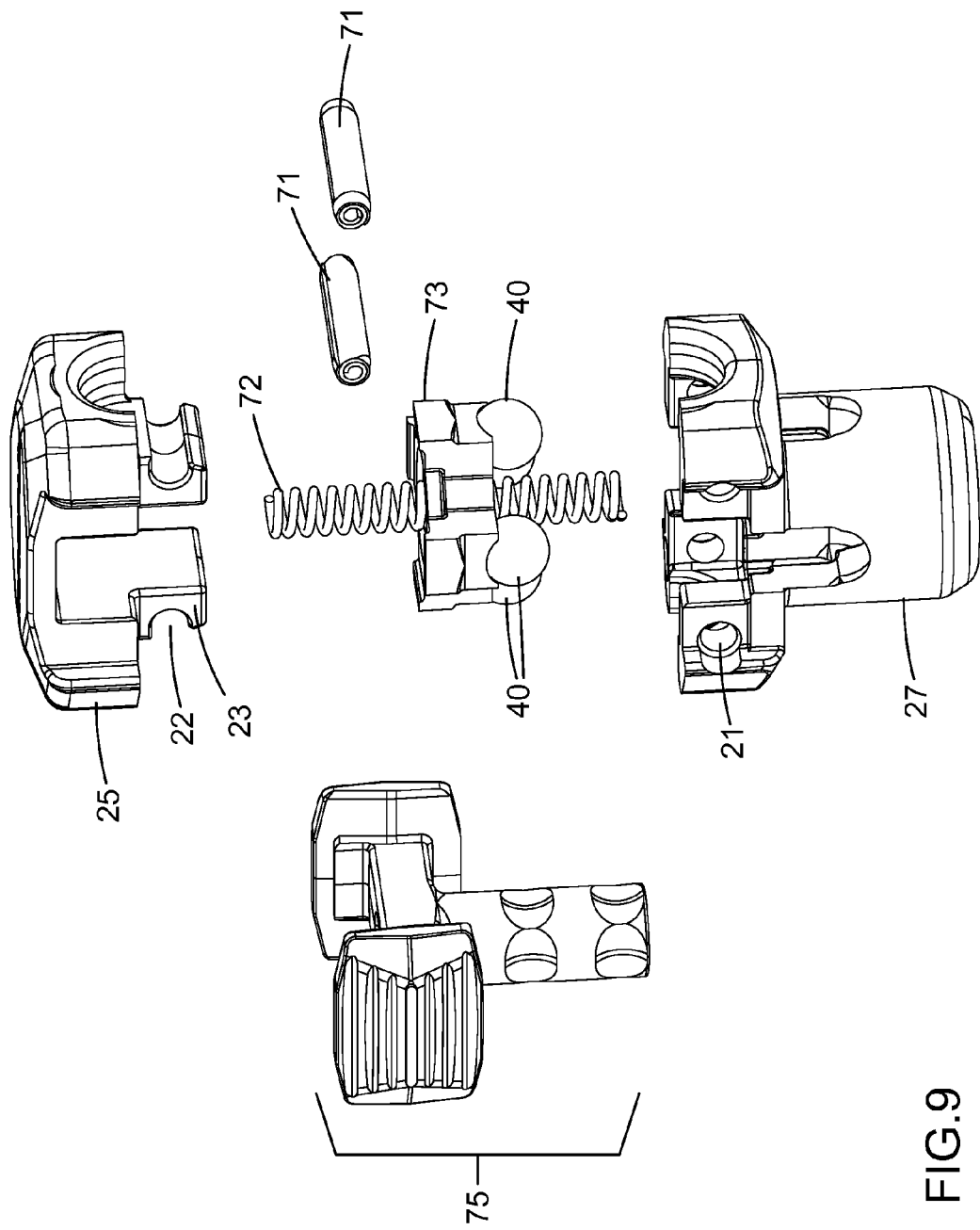
FIG. 9 is a further exploded view of the external and internal components of an embodiment of this disclosure.

FIGS. 8 and 9 show exploded views of the components housed within the housing 20, with the internal detent operational mechanism 70 of FIG. 8 being further exploded such that some components are shown in the manner in which they cooperate within the housing 20, and other components are not. In FIGS. 8 and 9, all of the components comprising the internal detent operational mechanism 70 can be seen. The components, including a center spring 72, a crown 73, and locking members 40 are shown in the manner in which they cooperate within the housing 20. However, the pins 71 and the retractor apparatus 75 are shown separately from their operational positions.

Still referring to FIG. 9, pins 71 can hold the upper housing 25 and lower housing 27 together. The upper housing 25 in the embodiment shown has a lower protrusions 23 which are curved to form spaces, or channels 22. When the upper housing 25 is coupled to the lower housing 27, the holes 21 in lower housing 27 and the lower protrusions 23 form an interlocking passage through which pins 71 can pass through and hold each piece in place. In the embodiment shown, the pins 71 may be coiled spring pins. Advantages to coiled spring pins are that they are low cost and provide sufficient strength to hold the upper housing 25 and lower housing 27 together. Additionally, they allow for some deviation in the size of the holes 21 that may take place during manufacturing. When inserted, coiled spring pins may be compressed with regard to diameter and then expand outward to fit tightly in place. When the upper housing 25 and lower housing 27 are coupled together, the lower protrusions 23 also serve to hold the crown 73 in place. The crown 73 is fixedly arranged by the lower protrusions 23 and the lower housing 25, such that the crown 73 remains substantially in place regardless of the position of the retractor apparatus 75 or the locking members 40. Though the crown 73 is described using the term "crown," the term is merely used for descriptive purposes, and should not be construed as limiting the crown 73 apparatus to its depicted shape. Differently shaped apparatuses may be used in place of the crown 73 which function to limit the upward movement of locking members 40 in a similar manner. Additionally, other methods and apparatuses to hold the crown 73 in place besides the pins 71 may be used, including adhesives, welding, or unitary construction.

The shapes of the crown 73 and the retractor apparatus 75, and their arrangement with the locking members 40, the upper housing 25, and the lower housing 27 as depicted provides advantages over prior art detent mechanisms. Often, the manufacturing process of detent mechanisms involves staking metal components in order to hold other components in place or to create recesses. That is, the metal is struck in order to deform it in certain places. This process can easily lead to manufacturing deviations and result in a poor fit between components. In contrast, each component of the accessory attachment 10, including the crown 73 and the retractor apparatus 75 can be injection molded to create their precise shapes, which means that they can fit together in a precise manner.

Figure 10:
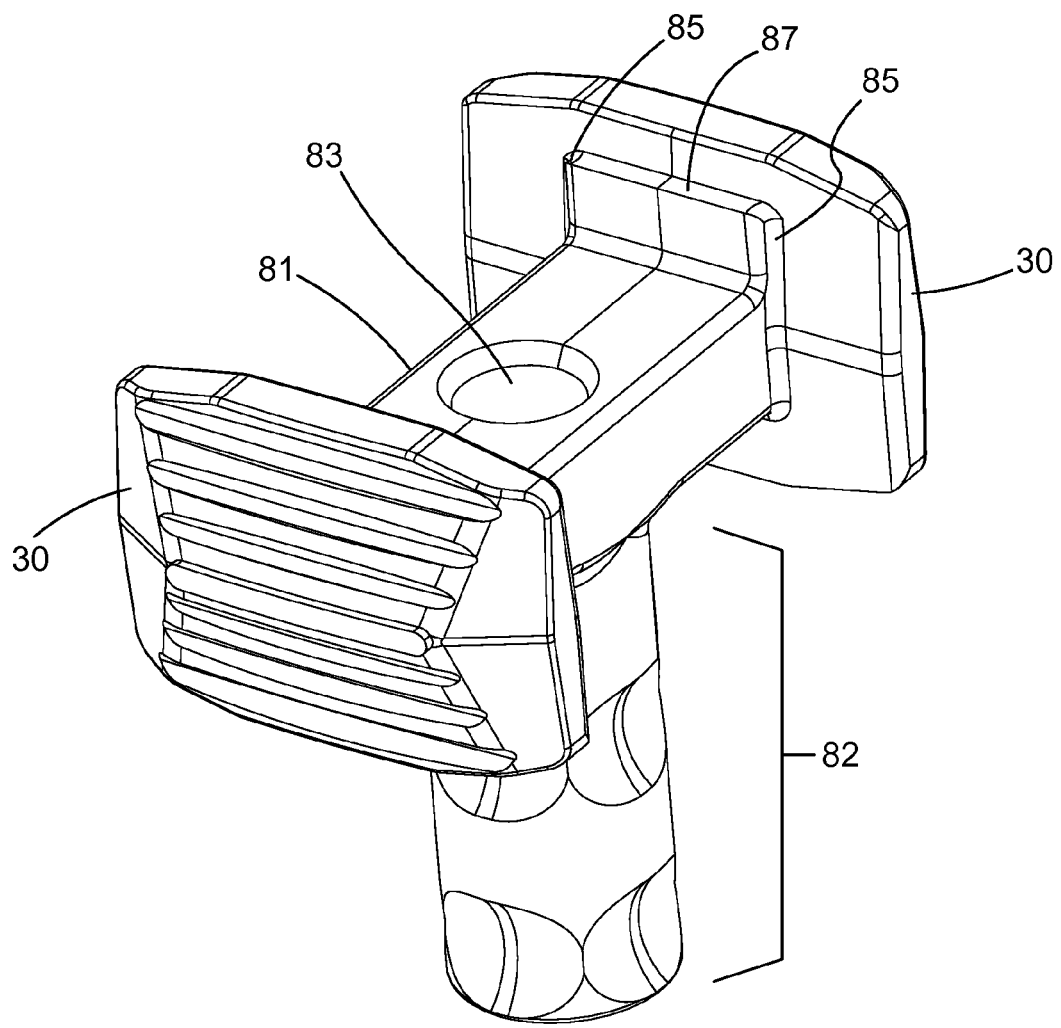
FIG. 10 is a top perspective view of the retractor column according to an aspect of the present disclosure.
Figure 11:
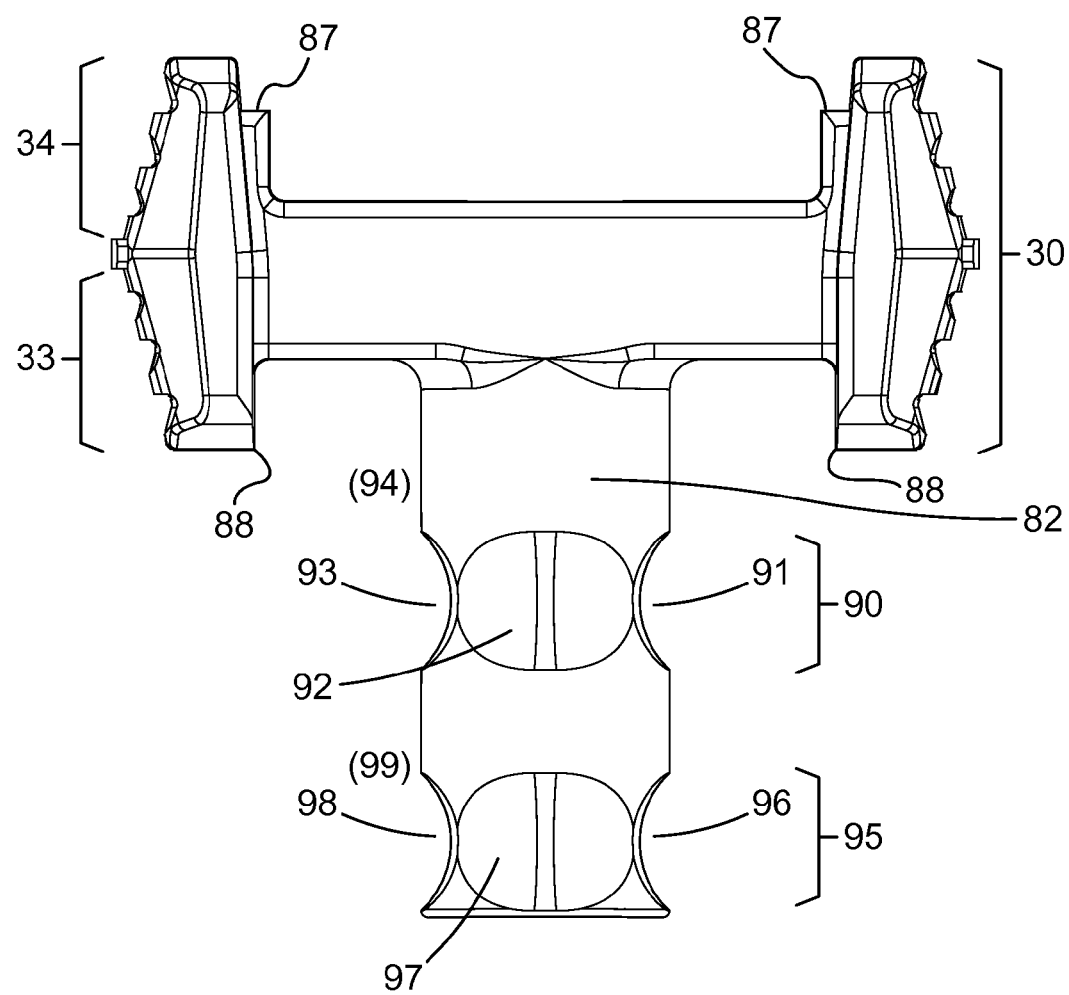
FIG. 11 is a side plan view of the retractor column of FIG. 10

The retractor apparatus 75, seen in an isolated enlarged view in FIGS. 10 and 11, can be integrally formed by a crossbar section 81 that terminates on both ends in finger grips 30, which may comprise upper halves 34 and lower halves 33. The retractor apparatus may also comprise a column section 82. For the purposes of this disclosure, a retractor apparatus can be defined as a structure that interfaces with one or more locking members and causes lateral motion of the one or more locking members, thereby engaging or releasing a detent apparatus. It is contemplated that the lateral motion of any locking members may be accomplished through the methods depicted herein, as well as through alternate ways of pivoting, folding, or translating. The retractor apparatus 75 comprises a column section 82 which can be solid or substantially hollow and defined by an opening 83 in the crossbar section 81. In an embodiment of the disclosure, the crossbar section 81 connects to the finger grips 30, and the connection point between the crossbar section 81 and the finger grips 30 defines a set of vertical guides 85. These vertical guides 85 help keep the retractor apparatus 75 aligned vertically (referring briefly to FIG. 14) within a groove 170 formed by the upper housing 25 and the lower housing 27. Additionally, the connection point between the crossbar section 81 and the finger grips 30 may comprise an upper ledge 87, which can protrude slightly from the finger grips 30. The retractor apparatus 75 may also include a lower ledge 88. In some embodiments, the upper ledge 87 and lower ledge 88 may serve to inhibit inadvertent movement of the retractor apparatus 75 in an upward or downward direction by engaging with (referring briefly to FIG. 13) the upper housing 25 or lower housing 27, respectively. Some possible mechanisms of this engagement will be described in more detail in the description accompanying FIG. 13. Alternatively, it is contemplated that some embodiments may not have an upper ledge 87 or lower ledge 88, or that they may be formed in a different configuration than that depicted.

An aspect of the disclosure is that the column section 82 comprises two sets of recesses, which include upper recesses 90 and lower recesses 95. In the embodiment depicted, the recesses 90 and 95 are rounded and reflect the shape of locking members 40. However, it is contemplated that the recesses 90 and 95 may form different shapes to reflect differently-shaped locking members. For example, the recesses 90 and 95 may be square or wedge-shaped.

Referring specifically to FIG. 11, in the embodiment depicted, upper recesses 90 comprise four individual recesses 91, 92, 93, and 94 (not shown). Lower recesses 95 comprise four individual recesses 96, 97, 98, and 99 (not shown). Each of the individual recesses are shaped to receive a respective locking member 40 in close contact, as will be described presently. As depicted, four individual recesses comprising upper recess 90 are situated to receive each of four locking members 40, with an axis running between the midpoints of a pair of recesses 91 and 93 that is parallel to the longitudinal axis of the crossbar section 81, and an axis running through the midpoint of the other pair of recesses 92 and 94 (not shown) that is perpendicular to the longitudinal axis of the crossbar section 81. The lower recess 95 is comprised of individual recesses situated similarly to those in upper recess 90.

Figure 12:
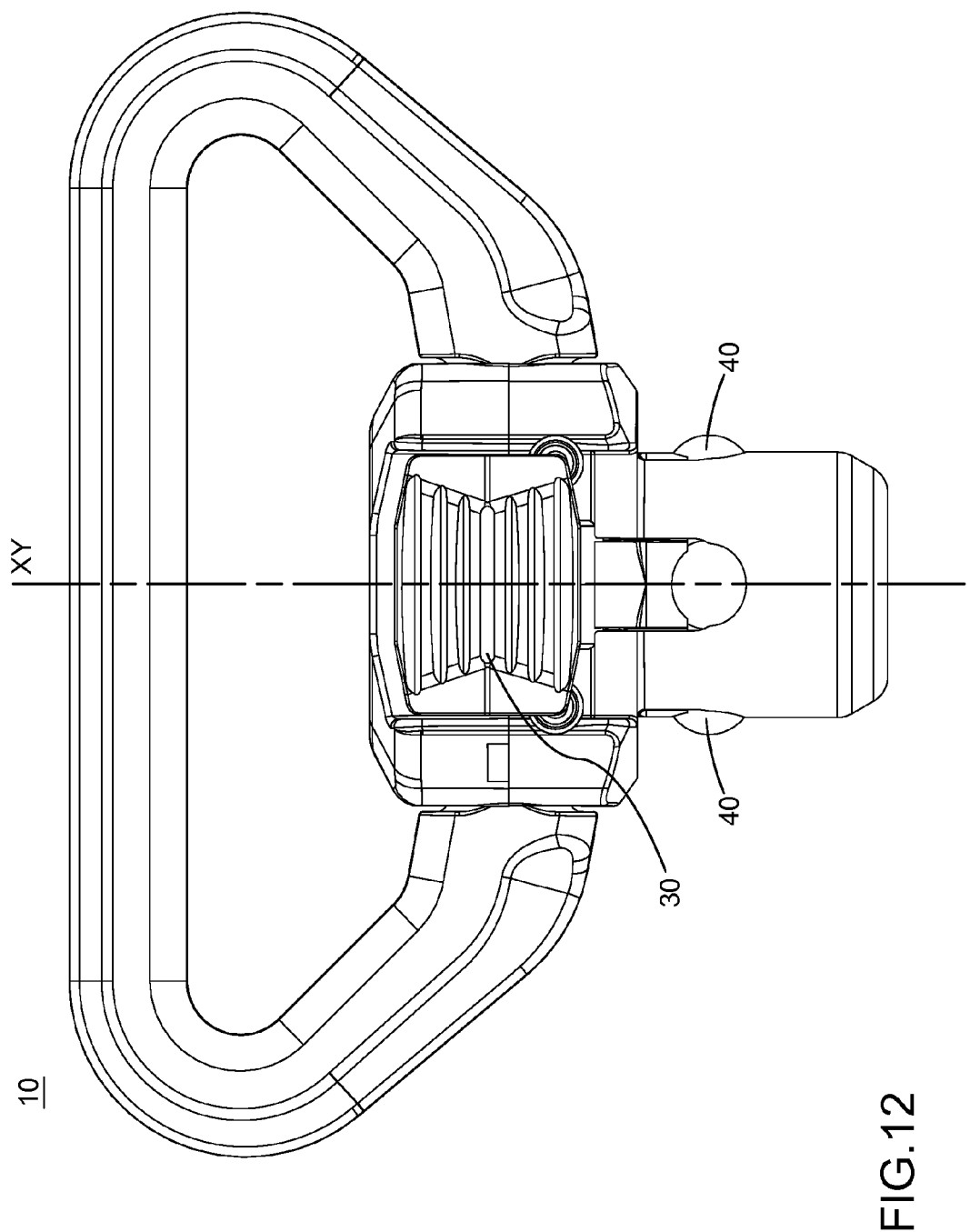
FIG. 12 is a front plan view of the accessory attachment with the retractor column in a neutral position, showing the plane against which the cross-section of FIG. 13 is taken.
Figure 13:
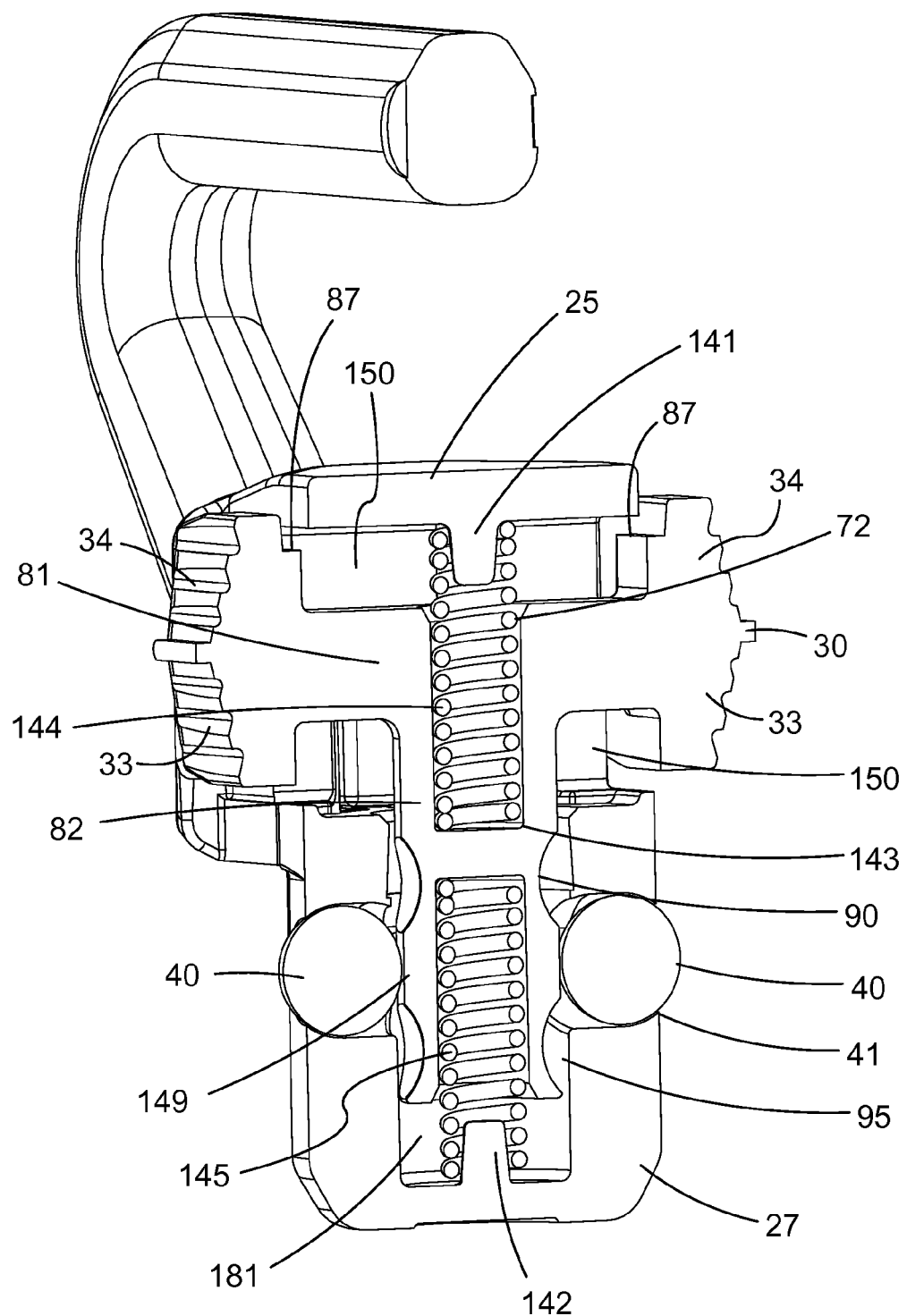
FIG. 13 is a cross-section view showing the internal components of an embodiment of the disclosure in a neutral position.

Turning now to FIGS. 12 and 13, FIG. 12 shows a side view of accessory attachment 10 and depicts the plane XY along which the cross-section is taken in the view in FIG. 13. The views in FIGS. 12 and 13 both depict the retractor apparatus 75 in a neutral position. That is, when the accessory attachment 10 is not being manipulated, the retractor apparatus 75 defaults to this position. Alternatively, this can be referred to as an "engaged" position, because in this position, the locking members 40 protrude from the circumference of the lower housing 27 thus securing the accessory attachment 10 to a receptacle. The engaged position of the locking members 40 is known in the art to be the position in which a detent holds an attachment to a mount, such as a QD attachment to a QD mount.

FIG. 13 shows the positions of the components of the internal detent mechanism 70 (as shown in isolation in FIG. 8) in the neutral or engaged position. The central spring 72 is disposed around an upper alignment prong 141 of the upper housing 25 and a lower alignment prong 142 of lower housing 27. The central spring 72 goes through the column section 82, to which it is attached at a midpoint 143. The central spring 72 may be attached to the upper alignment prong 141, the lower alignment prong 142, and the midpoint 143 by various means, including adhesive, mechanical integration, welding, molding, or any other way of bonding metals or polymers. Alternatively, the spring may simply be biased by the force created by the spring against a part of the retractor apparatus 75 itself. In the embodiment depicted, the central spring 72 is comprised of an upper spring 144 and a lower spring 145, which are separated at the midpoint 143. In this embodiment, the midpoint 143 comprises a physical barrier separating the hollow sections of the column section 83. However, as described previously, the central spring 72 may be attached to a midpoint 143 by various means, so midpoint 143 does not necessarily always comprise a physical barrier. As an alternative, the column section 83 may be hollow throughout, and the midpoint 143 may simply refer to a point in the middle of the column section 83. In the embodiment shown, by utilizing two springs with substantially equal force, the retractor apparatus 75 can remain biased in the neutral or engaged position at the midpoint of the central spring 72. Additionally, though the central spring 72 is shown as helical in this embodiment, other embodiments may comprise a non-helical central spring 72. When the retractor apparatus 75 is pulled upward or pushed downward, the external force (e.g., force from fingers pressing the finger grips 30) overcomes the force of the spring against which the external force is pressing. That is, one of the springs becomes compressed due to the external force. When the retractor apparatus 75 is released, the force from the compressed spring re-expanding to its neutral state will pull the retractor apparatus 75 back to its neutral position.

Referring specifically to the column section 82 in FIG. 13, both upper recesses 90 and lower recesses 95 are positioned at least partially above and at least partially below the locking members 40, respectively. In between upper recesses 90 and lower recesses 95 is an engagement surface 149. An engagement surface 149 has a larger circumference (if the column section 82 is cylindrical) or perimeter (if the column section 82 is not cylindrical) around the column section 82 than a perimeter around a midpoint of the upper recesses 90 and lower recesses 95. In the embodiment shown, and in many embodiments, the perimeter around a midpoint of the upper recesses 90 and lower recesses 95 may not be circular. The circumference (or perimeter) of the engagement surface can be substantially uniform with the circumference (or perimeter) of the entire column section 82, excluding the recessed areas. When in a neutral or engaged position, the engagement surface 149 has a circumference (or perimeter) such that the locking members 40 are pushed radially outward so as to at least partially extend beyond an outer circumference (or perimeter) of the entire column section 82. The windows 41 are configured and sized to allow the locking members 40 to move partially outward but remain mostly retained within the lower housing 27 For instance, the windows 41 can have narrower openings at the outermost edge of the lower housing than the size if the locking members 40, thus preventing the locking members 40 from exiting the windows.

FIG. 13 also shows a hollow area 150 above and below the crossbar section 81, and a lower housing hollow area 181, which allows room for the retractor apparatus 75 to move upward or downward, as will be more thoroughly described with reference to FIGS. 14-17. In some embodiments of the disclosure, the retractor apparatus 75 may tilt slightly off its vertical axis if force is applied unevenly to one or both of the finger grips 30. If uneven force is applied in an upward direction, the retractor apparatus 75 may tilt, and one of the upper ledges 87 (e.g., the upper ledge 87 on the side where more force is applied) may engage with a portion of the upper housing 25 such that further upper movement of the retractor apparatus 75 is inhibited. An advantage to the upper ledges 87 inhibiting movement in this way is that if one side of the finger grips 30 is bumped or hit accidentally from one side, the force of the accidental contact will not cause the retractor apparatus 75 to move far in an upward manner. When the retractor apparatus 75 is moved towards its uppermost position, the accessory attachment 10 may become detached from its mount, the mechanism of which will be described presently. Therefore, the engagement of the upper ledges 87 with the upper housing 25 may prevent accidental removal of the accessory attachment 10 from its mount. In a similar manner, lower ledges 88 may also prevent accidental removal of the accessory attachment 10 from its mount by engaging with the lower housing 27. If force is applied unevenly, or to just one side of the finger grips 30, in a downward motion, the retractor apparatus may tilt slightly vertically, causing one of the lower ledges 88 to engage with the lower housing and impede downward movement. This function of the lower ledges 88 is advantageous because otherwise, it would be possible for inadvertent downward movement to cause the locking members 40 to retract.

It is contemplated that the retractor apparatus 75, including the finger grips 30, may be comprised of a hard material such as metal or polymer and may not be flexible in response to manual force. In other embodiments, however, the finger grips 30 may be somewhat flexible in certain aspects. In some embodiments, for example, if a user exerts orthogonal pressure with two fingers on both finger grips 30, specifically upon the lower halves 33, then the lower halves 33 may slightly give way to the pressure, causing the upper halves 34 to flare or bend slightly outwardly. As the upper halves 34 flare outwardly, so may the upper ledges 87 flare outwardly with them. As a result, the upper ledges 87 may not engage with any portion of the upper housing 25, and may not inhibit the movement of the retractor apparatus 75 upwardly. Similarly, a squeezing force exerted by the user on the upper halves 34 of finger grips 30 may also cause the lower ledges 88 to flare away from the lower housing 27. In such embodiments with flexible finger grips 30 may provide extra clearance between the finger grips 30 and the upper and lower housing 25 and 27. However, either non-flexible or flexible finger grips 30 are contemplated in various embodiments, and both may provide the advantages of preventing inadvertent removal while allowing easy intentional coupling and removal.

Figure 14:
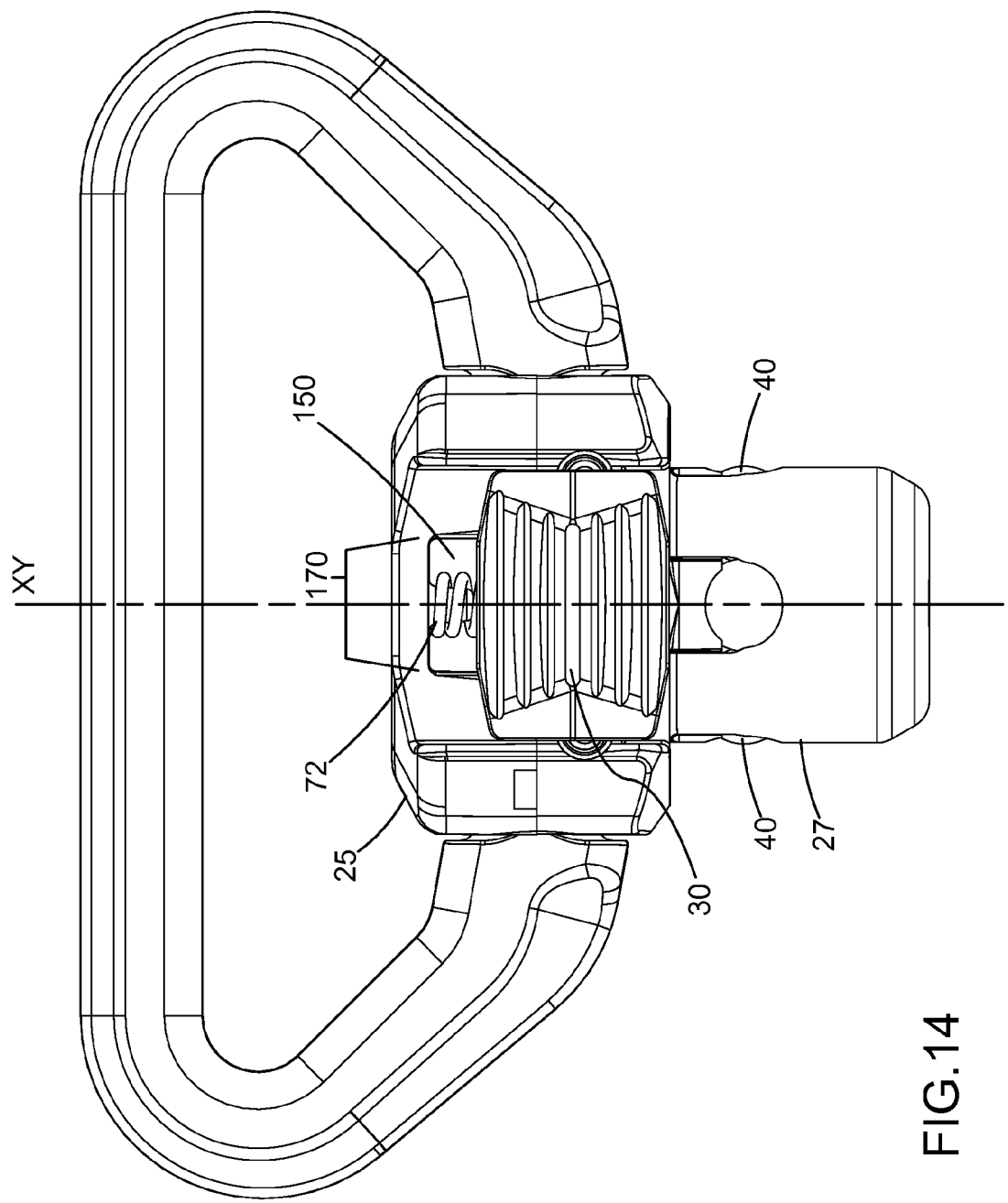
FIG. 14 is a front plan view of the accessory attachment with the retractor column in a pushed-down position, showing the plane against which the cross-section of FIG. 15 is taken.
Figure 15:
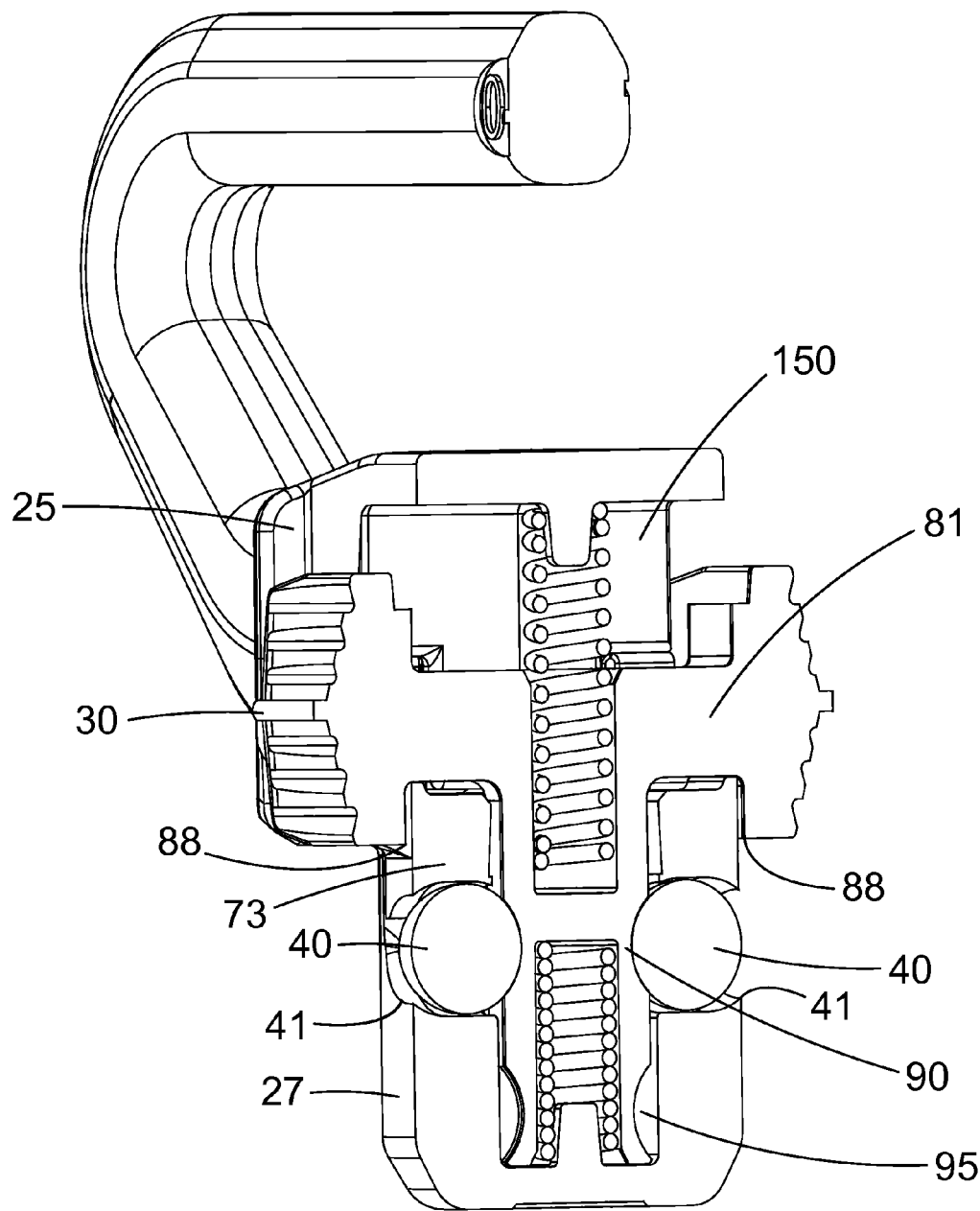
FIG. 15 is a cross-section view showing the internal components of an embodiment of the disclosure in a pushed-down position.

FIG. 14 shows a side view of accessory attachment 10 and depicts the XY plane along which the cross section view of FIG. 15 is taken. As seen in FIG. 14, finger grips 30 are in a pushed down position (e.g., one of two "unlocked" or "released" positions). In this position, the empty space 150 above the crossbar section 81 (not shown in FIG. 14) and central spring 72 are visible within the upper housing 25. Locking members 40 are in a retracted position and are substantially flush with the outside of the lower housing 27.

Referring now to FIG. 15, shown is the cross section of FIG. 14 taken along the XY plane. Finger grips 30 are in the pushed down position (e.g., one of two "unlocked" or "released" positions). In comparison to FIG. 13, where there was a substantially equal amount of empty space 150 above and below the crossbar section 81, here in FIG. 16, there is an increased amount of empty space 150 above the crossbar section 81 and no or virtually no empty space below. Instead, the bottom of crossbar section 81 is in contact with the top side of the crown 73. Because the finger grips 30 and crossbar section 81 of the retractor apparatus 75 are pushed down, the column section 82, the upper recesses 90, and the lower recesses 95 are also pushed down from an engaged position. The crown 73 remains in place, as does the lower housing 27. The locking members 40 move laterally in relation to the windows 41, but remain substantially in place with respect to their vertical orientation in relation to the windows 41. As the upper recesses 90 align with the locking members 40, the locking members 40 may be received into the upper recesses 90 such that the locking members 40 are substantially flush with the outer circumference of the lower housing 27. The bottom of the column section 82 and the lower recesses 95 then occupy at least part of the lower housing empty space 181.

A force from outside of the housing may push the locking members 40 inward. For example, if the accessory attachment 10 were inserted into a corresponding mount, the mount would have a cup or receptacle with a circumference that closely circumscribed the lower housing 27. If the lower housing 27 were inserted into a mount without pushing the finger grips 30 downward (or upward, as will be described presently), the lower housing 27 would not be able to advance into the mount cup farther than the protruding locking members 40. However, when the finger grips 30 are pushed down, the upper recesses 90 slide down to align with the locking members 40, and the force from the downward motion of the user inserting the accessory attachment 10 against the walls of the cup of the mount pushes the locking members 40 substantially horizontally into the lower housing 27, allowing the lower housing 27 to be inserted all the way into the mount until it meets the ledge 29 (as depicted in FIG. 4) above the locking members 40. Once the lower housing 27 is inserted into the mount, the finger grips 30 may be released, which allows the central spring 72 to return the retractor apparatus 75 to its engaged position. The locking members 40 will then be pushed partially outward from the lower housing 27 into a groove or recess for engaging a detent.

Figure 16:
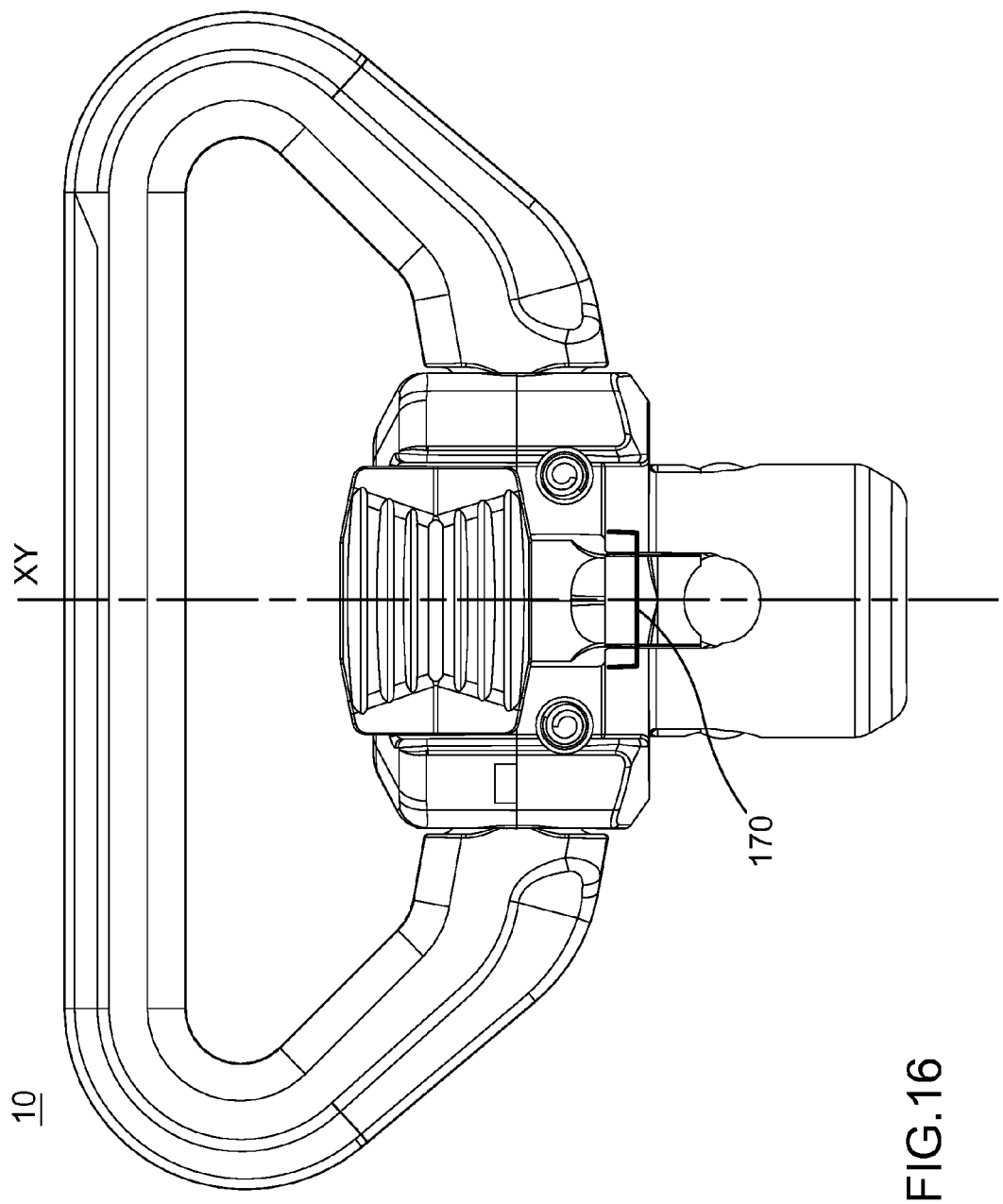
FIG. 16 is a front plan view of the accessory attachment with the finger grips in a pulled-up position, showing the plane against which the cross-section of FIG. 17 is taken.
Figure 17:
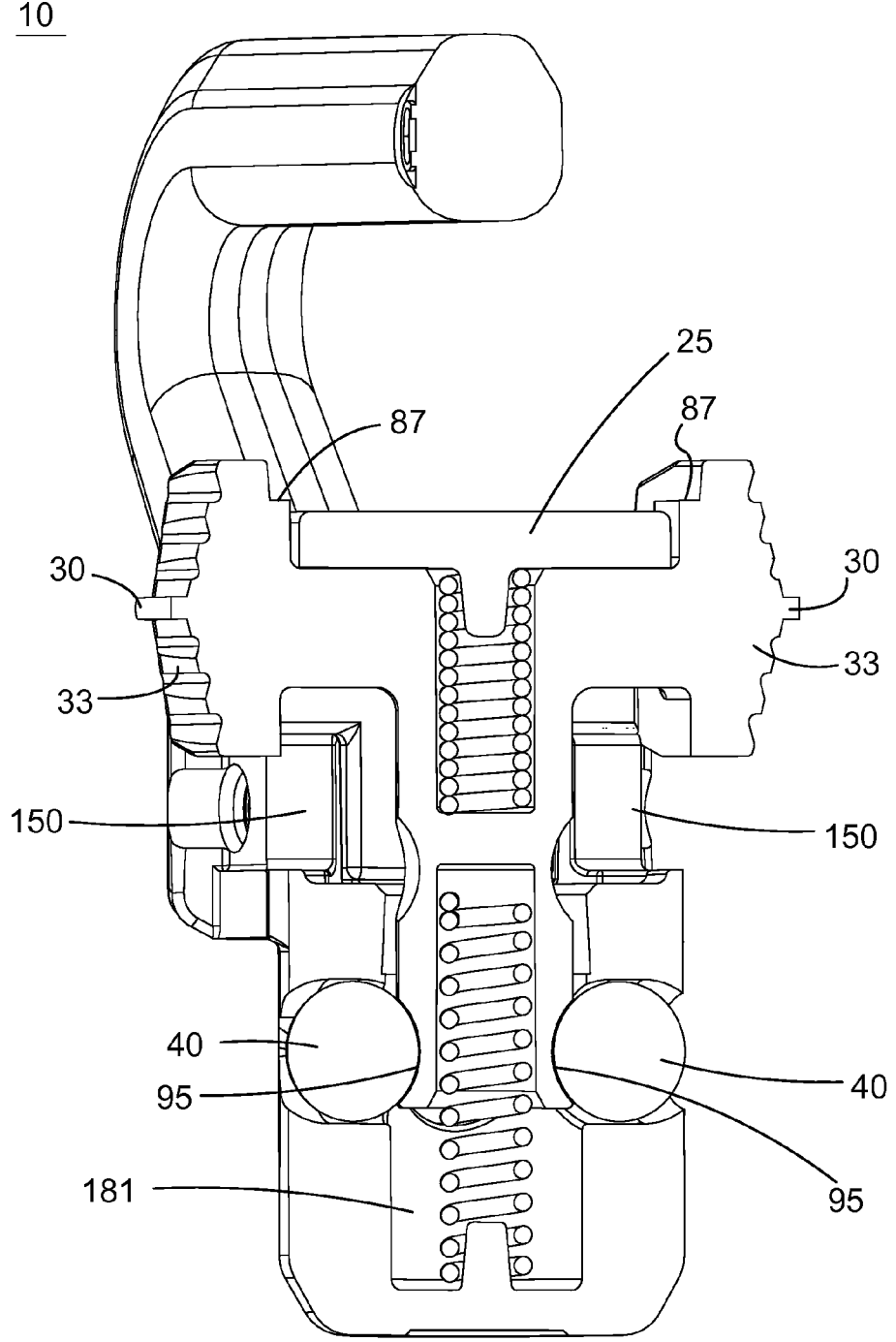
FIG. 17 is a cross-section view showing the internal components of an embodiment of the disclosure in a pulled-up position.

Turning now to FIGS. 16 and 17, FIG. 16 shows a side view of the accessory attachment 10 with the finger grips 30 in a pulled up position (or a released position) and depicts the XY plane along which the cross section view in FIG. 17 is taken. FIGS. 14 and 16 show the upper and lower parts of a groove 170 that guides the vertical movement of the finger grips 30 and attached crossbar section 81. The groove 170 extends between and includes parts of the upper housing 25 and the lower housing 27. The movement of the entire retractor apparatus 82 is therefore bounded upward only by the upper most portion of the upper housing 25 and downward by the crown 73. Therefore, the finger grips 30 can be pushed upward or downward within this groove 170. As described earlier with reference to FIG. 10, the retractor apparatus 75 has guides 85 that align the retractor apparatus 75 vertically within the groove 170. Additionally, the structure of the crossbar 81 itself may serves to align the retractor apparatus 75 within the groove 170.

FIG. 17 shows the mechanism by which the detent can be disengaged by pulling upward on the finger grips 30 in addition to being pushed down. The finger grips 30 may be held by two fingers such that the retractor apparatus 75 is stabilized in a vertical orientation and does not tilt one way or the other. When the retractor apparatus 75 is manipulated in this manner, the upper ledges 87 do not prevent upward movement. When the finger grips 30 are pulled upward, the lower recesses 95 align with and receive the locking members 40. In this position, the empty space 150 below the crossbar section 81 is increased relative to the neutral position, and the empty space 150 above is virtually nonexistent. The lower housing empty space 181 is increased relative to the neutral position. When the accessory attachment is in a mount and the finger grips 30 are pulled upwards in this manner, the crossbar section 81 meets the uppermost portion of the upper housing 25 and exerts upward pressure on the entire accessory attachment 10. The cup of the mount will exert pressure on the locking members 40 to move inward and be received by the lower recesses 95 as the accessory attachment 10 is pulled out. The accessory attachment 10 can be completely removed from its mount simply by pulling the finger grips 30 upward in one motion. Because the accessory attachment may also be completely inserted into the mount by pushing the finger grips 30 downward in one motion, the user does not have to apply force to the accessory attachment in more than one direction to attach or remove it from its mount.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An accessory attachment, comprising:
   a housing with a top end and a bottom end;
   at least one locking member;
   a spring-biased retractor apparatus that interfaces with the at least one locking member to move the at least one locking member from an engaged position to a disengaged position;
   finger grips coupled to the retractor apparatus and disposed on substantially opposite sides of the housing;
   wherein the accessory attachment may be attached to, or removed from, a mounting receptacle either by pushing or pulling the finger grips toward or away from either end of the housing substantially parallel to a longitudinal axis of the housing.

2. The accessory attachment of claim 1, wherein the spring-biased retractor apparatus comprises an upper recess for receiving the at least one locking member in a disengaged position, a lower recess for receiving the at least one locking member in another disengaged position, and an engagement surface disposed between the upper recess and the lower recess for supporting the at least one locking member in the engaged position.

3. The accessory attachment of claim 1, further comprising four locking members.

4. The accessory attachment of claim 1, wherein the spring-biased retractor apparatus comprises a hollow column section and a spring attaches to the retractor apparatus within the hollow column section.

5. The accessory attachment of claim 1, wherein the retractor apparatus is biased between two or more springs.

6. The accessory attachment of claim 5, wherein one of the two or more springs is compressed while another of the two or more springs is extended by the pulling or pushing of the finger grips.

7. The accessory attachment of claim 1, wherein the top of the housing is configured to attach to an accessory by one of a clip, hook, loop, buckle, button, or a customized accessory interface.

8. The accessory attachment of claim 1, wherein the finger grips comprise two separate surfaces for gripping.

9. The accessory attachment of claim 8, further comprising a substantially rigid bail that forms a sling loop, wherein the bail has a top rigid bar member and is attached to the sides of the housing by linking members that connect to the housing between the finger grips.

10. The accessory attachment of claim 9, wherein the rigid bail rotates about the housing.

11. The accessory attachment of claim 1, wherein the housing is comprised of an upper housing and a lower housing.

12. The accessory attachment of claim 11, wherein the upper housing and lower housing comprise a vertical groove within which the retractor apparatus may be pulled up or pushed down.

13. The accessory attachment of claim 1, further comprising a crown for retaining the locking members substantially in place with respect to the longitudinal axis of the housing.

14. The accessory attachment of claim 1, wherein the finger grips include ridges that provide a gripping surface and endpoints that slope away from a midpoint.

15. The accessory attachment of claim 1, wherein one or more components are made out of a metal.

16. A firearm accessory attachment system comprising;
   a firearm accessory,
   a firearm configured with a quick-detach mounting receptacle, an accessory attachment comprising;
      a housing with a top end and a bottom end;
      at least one locking member;
      a spring-biased retractor apparatus that interfaces with the at least one locking member to move the at least one locking member from an engaged position to a disengaged position;
      finger grips coupled to the retractor apparatus and disposed on opposite sides of the housing;
      wherein the accessory attachment may be attached to, or removed from, the quick-detach mounting receptacle either by pushing or pulling the finger grips toward or away from either end of the housing parallel to a longitudinal axis of the housing.

17. The system of claim 16 wherein the firearm accessory is a sling.

18. The system of claim 16 wherein the finger grips are indirectly coupled to the retractor apparatus.

19. The system of claim 16, wherein the accessory attachment can rotate within the quick-detach mounting receptacle.

20. The system of claim 16, the accessory attachment further comprising one of among a clip, hook, loop, buckle, button, or customized accessory interface.

21. A sling attachment system, comprising:
   a sling;
   an article, configured with a mounting receptacle, to be supported by the sling;
   an accessory attachment that couples the sling to the article, the accessory attachment comprising;
   a housing with a top end and a bottom end;
   at least one locking member;
   a spring-biased retractor apparatus that interfaces with the at least one locking member to move the at least one locking member from an engaged position to a disengaged position;
   finger grips coupled to the retractor apparatus and disposed on opposite sides of the housing;
   wherein the accessory attachment may be attached to, or removed from, the mounting receptacle either by pushing or pulling the finger grips toward or away from either end of the housing parallel to a longitudinal axis of the housing.

22. The sling attachment system of claim 21, wherein the article is one of:
   a backpack, a bag, a piece of luggage, an instrument, or a weapon.

23. The sling attachment system of claim 21, wherein the accessory attachment is configured to attach to an accessory by one of:
   a clip, hook, loop, buckle, button, or a customized accessory interface.

24. A tether attachment system, comprising:
   a tether;
   an article, configured with a mounting receptacle, to be coupled to an end of the tether;
   an accessory attachment that couples the tether to the article, the accessory attachment comprising,
   a housing with a top end and a bottom end;
   at least one locking member;
   a spring-biased retractor apparatus that interfaces with the at least one locking member to move the at least one locking member from an engaged position to a disengaged position;
   finger grips coupled to the retractor apparatus and disposed on opposite sides of the housing;
   wherein the accessory attachment may be attached to, or removed from, the mounting receptacle either by pushing or pulling the finger grips toward or away from either end of the housing parallel to a longitudinal axis of the housing.

25. The tether attachment system of claim 24, wherein the tether comprises a fabric.

26. The tether attachment system of claim 24, wherein the accessory attachment is configured to attach to an accessory by one of:
   a clip, hook, loop, buckle, button, or a customized accessory interface.

* * * * *